(12) United States Patent
Shinoda et al.

(10) Patent No.: US 11,090,554 B2
(45) Date of Patent: Aug. 17, 2021

(54) SIMULATION SYSTEM, IMAGE PROCESSING METHOD, AND INFORMATION STORAGE MEDIUM

(71) Applicant: BANDAI NAMCO Entertainment Inc., Tokyo (JP)

(72) Inventors: Tetsuya Shinoda, Yokohama (JP); Masahiro Kimoto, Yokohama (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 0 days.

(21) Appl. No.: 16/710,106

(22) Filed: Dec. 11, 2019

(65) Prior Publication Data
US 2020/0108308 A1    Apr. 9, 2020

Related U.S. Application Data

(63) Continuation of application No. PCT/JP2018/021916, filed on Jun. 7, 2018.

(30) Foreign Application Priority Data

Jun. 12, 2017  (JP) .............. JP2017-115421

(51) Int. Cl.
*A63F 13/212* (2014.01)
*A63F 13/26* (2014.01)
(Continued)

(52) U.S. Cl.
CPC ............ *A63F 13/212* (2014.09); *A63F 13/26* (2014.09); *A63F 13/428* (2014.09); *A63F 13/53* (2014.09); *A63F 2300/8082* (2013.01)

(58) Field of Classification Search
CPC ...... A63F 13/428; A63F 13/53; A63F 13/213; A63F 2300/8082
See application file for complete search history.

(56) References Cited

U.S. PATENT DOCUMENTS 8,487,938 B2     7/2013  Latta et al.
2012/0249443 A1* 10/2012 Anderson ........... G06F 3/04883
                                                                       345/173
(Continued)

FOREIGN PATENT DOCUMENTS

JP     H11-309269 A     11/1999
JP     2009-070416 A     4/2009
(Continued)

OTHER PUBLICATIONS

International Search Report of the International Searching Authority dated Sep. 4, 2018 for the corresponding international application No. PCT/JP2018/021916 (and English translation).

*Primary Examiner* — James S. McClellan
(74) *Attorney, Agent, or Firm* — Posz Law Group, PLC

(57) ABSTRACT

A simulation system includes a processor including hardware. The processor performs an information acquisition process of acquiring user information including at least one of position information, direction information, and posture information of a user, a virtual space setting process of setting a virtual space, a moving body process of moving a user character corresponding to the user in the virtual space, a game process that is a process for a game in the virtual space, and a display process of generating an image in the virtual space as a display image to be displayed for the user. In the game process, the processor determines whether the user has made an item acquisition motion based on the user information, and upon determination that the user has made the item acquisition motion, performs a process of causing the user character to acquire an item.

20 Claims, 25 Drawing Sheets

(51) Int. Cl.
*A63F 13/428* (2014.01)
*A63F 13/53* (2014.01)

(56) References Cited

U.S. PATENT DOCUMENTS

| | | | |
|---|---|---|---|
| 2014/0221062 A1* | 8/2014 | Shinoda | A63F 13/803 463/6 |
| 2017/0266551 A1 | 9/2017 | Baba | |
| 2019/0187479 A1* | 6/2019 | Nishizawa | G06F 1/163 |

FOREIGN PATENT DOCUMENTS

| | | |
|---|---|---|
| JP | 2012-516507 A | 7/2012 |
| JP | 2013-059574 A | 4/2013 |
| JP | 5996138 B1 | 9/2016 |

\* cited by examiner

FIG. 2A
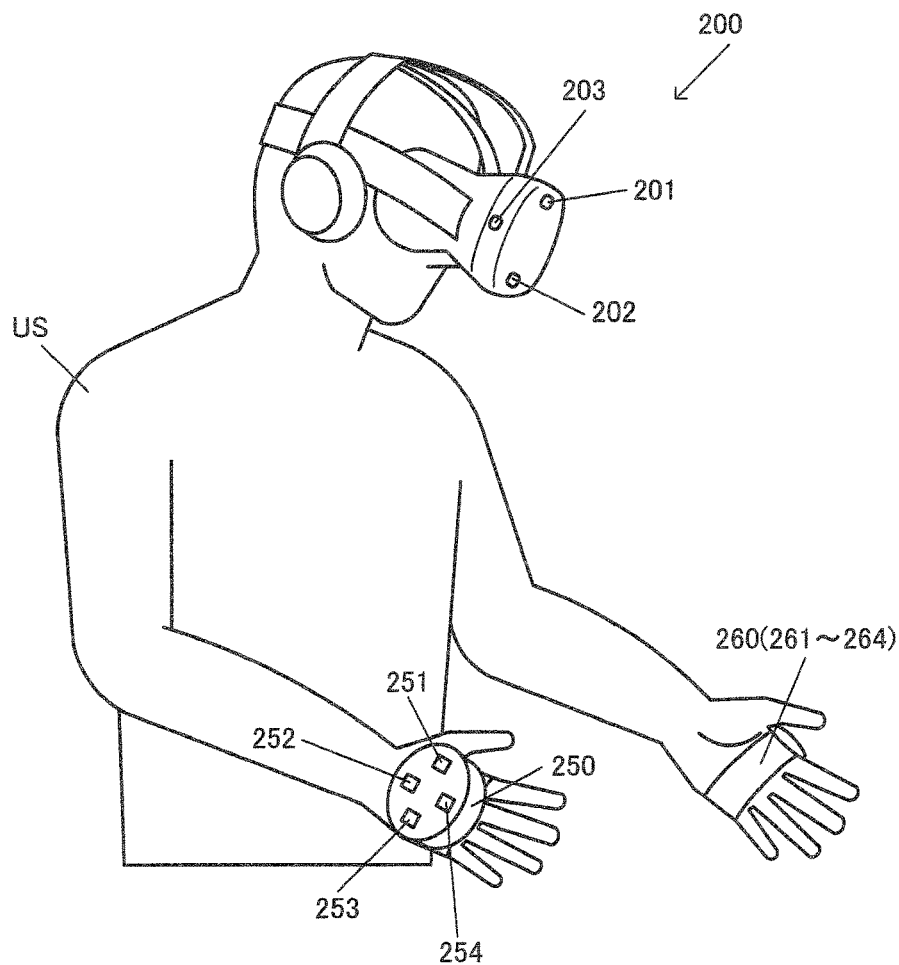
FIG. 2B
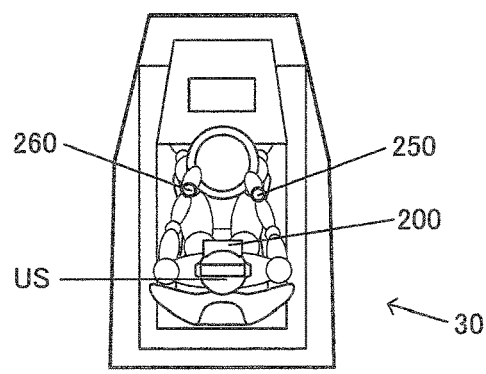

ITEM USE (THROWING)

ITEM USE (SWINGING)

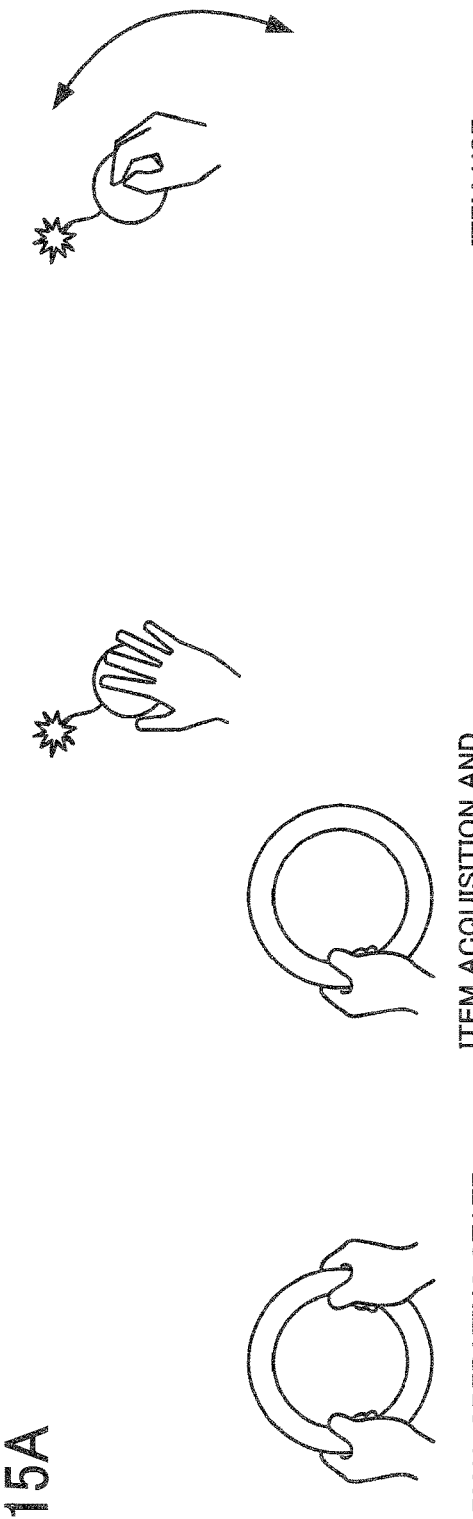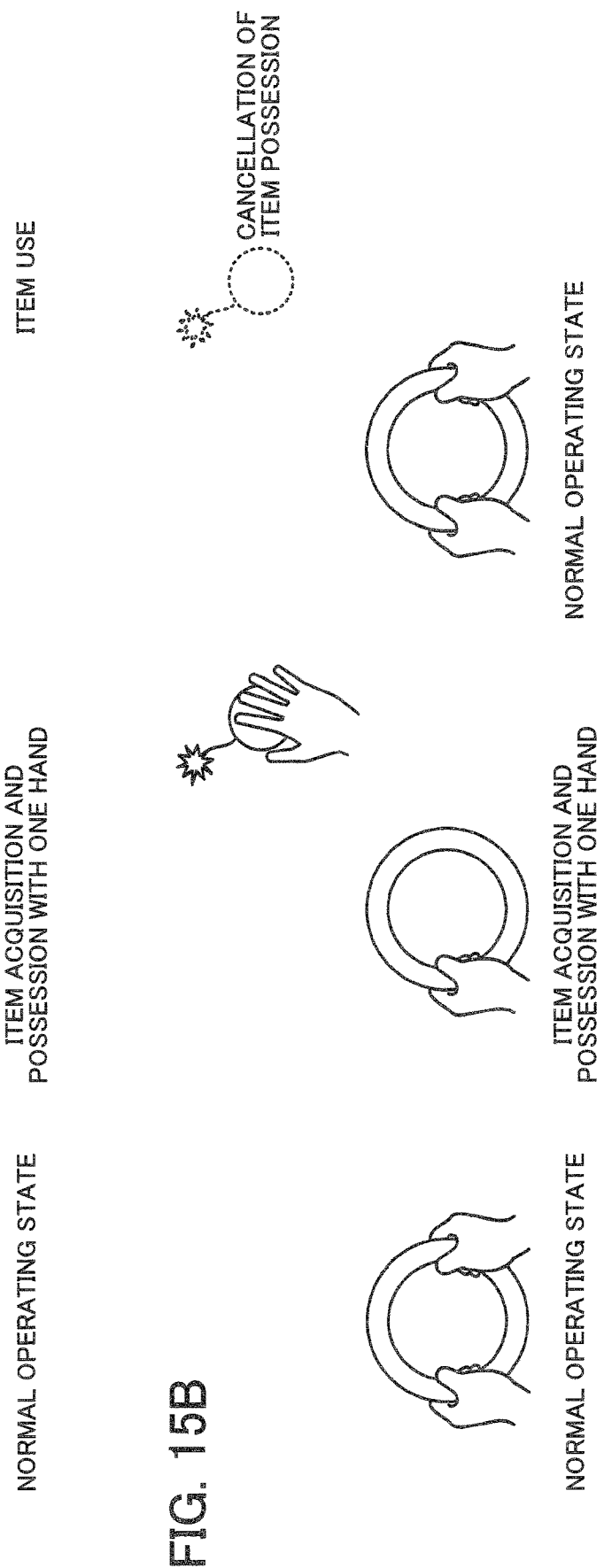

ITEM ACQUISITION AND POSSESSION

BASIC POSTURE STATE

CANCELLATION OF ITEM POSSESSION

SIMULATION SYSTEM, IMAGE PROCESSING METHOD, AND INFORMATION STORAGE MEDIUM

CROSS REFERENCE TO RELATED APPLICATION

This application is a continuation of International Patent Application No. PCT/JP2018/021916, having an international filing date of Jun. 7, 2018, which designated the United States, the entirety of which is incorporated herein by reference. Japanese Patent Application No. 2017-115421 filed on Jun. 12, 2017 is also incorporated herein by reference in its entirety.

BACKGROUND

The disclosure relates to a simulation system, an image processing method, an information storage medium, and the like.

Conventionally, simulation systems that generate an image as viewed from a virtual camera in a virtual space have been known. For example, Japanese Unexamined Patent Application Publication No. 1999-309269 discloses a conventional technique of a simulation system that implements virtual reality (VR) by displaying an image as viewed from a virtual camera on a head mounted display (HMD). In addition, Japanese Unexamined Patent Application Publication No. 2013-59574 discloses a conventional technique of a system that implements a racing game with which a user enjoys driving a racing car in a virtual space.

Unfortunately, according to a system disclosed by Japanese Unexamined Patent Application Publication No. 2013-59574, a user can only enjoy a game of driving a racing car in a virtual space by operating a steering wheel of a game chassis, and the user keeps holding the steering wheel with both hands throughout gameplay. The system does not employ a play element such as acquiring an item disposed on a course and using the acquired item. If the play element such as item acquisition is introduced into a game such as a racing game and the item is acquired irrelevantly to an intention or a motion of the user, virtual reality for the user is deteriorated and a sense of immersion in the game is reduced.

BRIEF DESCRIPTION OF THE DRAWINGS

FIG. 2A and FIG. 2B are diagrams illustrating an example of a tracking process for an HMD.

FIG. 15A and FIG. 15B are diagrams illustrating the acquisition, the possession, the use, and cancellation of the possession of the item.

DESCRIPTION OF EXEMPLARY EMBODIMENTS

Figure 1:
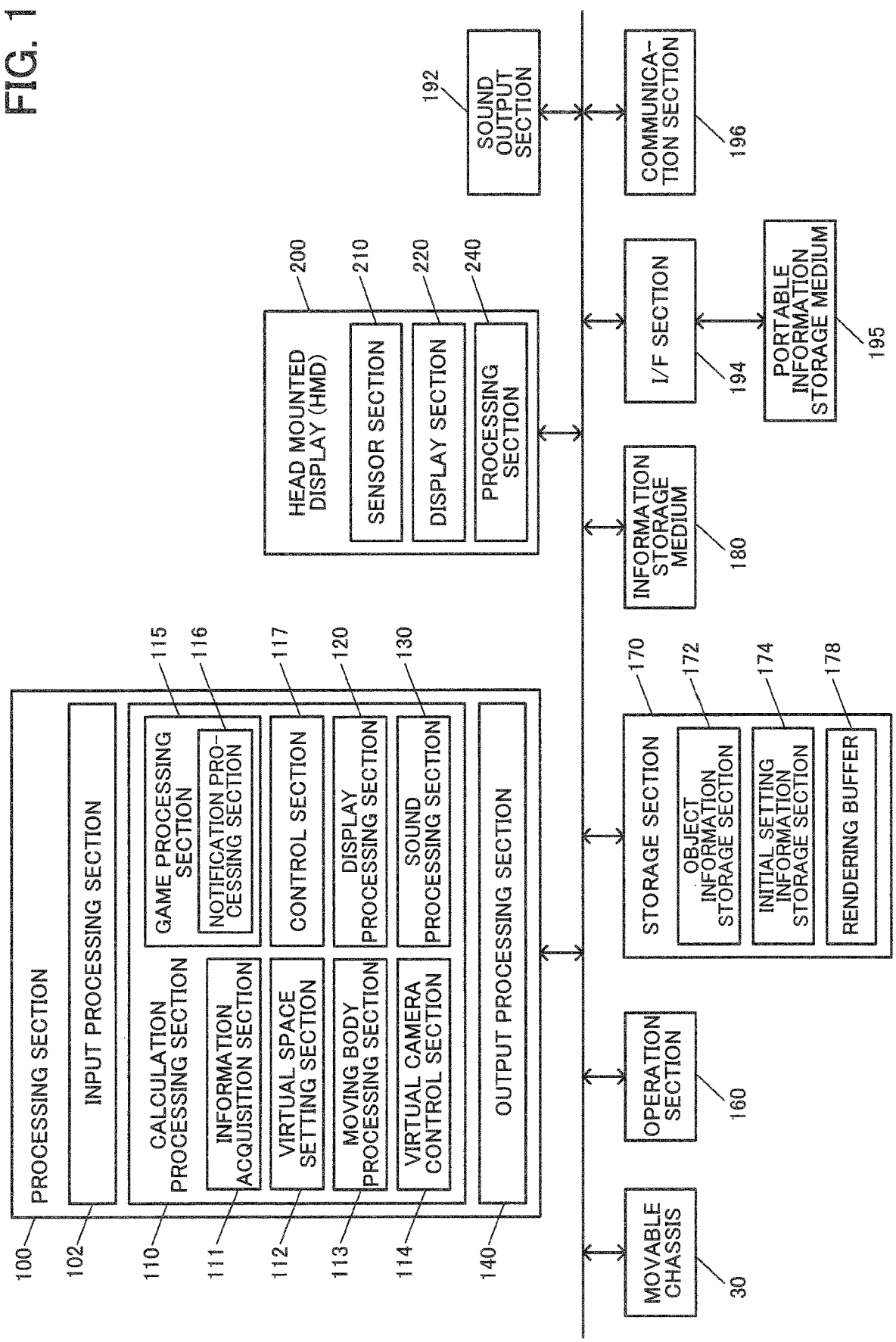
FIG. 1 is a block diagram illustrating a configuration example of a simulation system according to the present embodiment.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

Exemplary embodiments are described below. Note that the following exemplary embodiments do not in any way limit the scope of the content defined by the claims laid out herein. Note also that all of the elements described in the present embodiment should not necessarily be taken as essential elements.

1. Simulation System

FIG. 1 is a block diagram illustrating a configuration example of a simulation system (a simulator, a game system, an image generation system) according to the present embodiment. The simulation system according to the present embodiment is a system that simulates virtual reality (VR) for example, and can be applied to various systems such as a game system providing game content, a real-time simulation system including a driving simulator and a sports event simulator, a system providing SNS service, a content providing system that provides a content such as an image, or an operating system for implementing a remote controlled operation. The simulation system according to the present embodiment is not limited to the configuration illustrated in FIG. 1, and can be modified in various ways including omitting some of its components (sections) or adding another component.

A movable chassis 30 (a chassis in a broad sense) is a chassis that changes a play position of a user. The movable chassis 30 is what is known as an arcade chassis and the like for example, and serves as an outer housing for a simulation system device. The movable chassis is not necessarily in a box shape. The movable chassis 30 may be a cockpit chassis (experience chassis) for a car game, a robot game, an aircraft game or the like, or may be a chassis for other forms. The movable chassis 30 serves as a main body portion of the simulation system, and is provided with various devices and structures for implementing the simulation system. The movable chassis 30 is at least set with a play position. A configuration example of the movable chassis 30 will be described in detail later with reference to FIG. 4.

An operation section 160 is used by a user (player) to input various types of operation information (input information). The operation section 160 can be implemented by various operation devices such as a steering wheel, an accelerator pedal, a brake pedal, a lever, an operation button, a direction designating key, or a voice input device, for example. For example, as for the movable chassis 30 in FIG. 4 that will be described later, the operation section 160 is implemented by a steering wheel 50, an accelerator pedal 52, and a brake pedal 54 (not illustrated).

A storage section 170 stores various types of information. The storage section 170 functions as a work area for a processing section 100, a communication section 196, and the like. The storage section 170 stores a game program and game data required for executing the game program. The function of the storage section 170 can be implemented by a semiconductor memory (dynamic random access memory (DRAM), video random access memory (VRAM)), a hard disk drive (HDD), a solid state drive (SSD), an optical disc device, or the like. The storage section 170 includes an object information storage section 172, an initial setting information storage section 174, and a rendering buffer 178.

An information storage medium 180 (computer-readable medium) stores a program, data, and the like. The function of the information storage medium 180 can be implemented by an optical disc (a digital versatile disc (DVD), a Blu-ray disc (BD), a compact disc (CD)), an HDD, a semiconductor memory (read only memory (ROM)), and the like. The processing section 100 performs various processes according to the present embodiment based on a program (data) stored in the information storage medium 180. That is, the information storage medium 180 stores a program for causing a computer (a device including an input device, a processing section, a storage section, and an output section) to function as the sections according to the present embodiment (a program for causing a computer to perform processes of the sections).

A head mounted display (HMD) 200 is a device that is worn on the head of the user, and displays an image in front of the eyes of the user. The HMD 200 is preferably a non-transparent type, but may also be a transparent type. The HMD 200 may be what can be referred to as an eye-piece type HMD.

The HMD 200 includes a sensor section 210, a display section 220, and a processing section 240. A modification where the HMD 200 is provided with a light emitting element may be employed. The sensor section 210 implements a tracking process such as head tracking for example. For example, a position and/or a direction of the HMD 200 is identified through the tracking process performed with the sensor section 210. With the position and/or the direction of the HMD 200 thus identified, a point-of-view position and/or a line-of-sight direction of the user can be identified.

Various tracking schemes can be employed. One example of the tracking schemes is a first tracking scheme using a plurality of light receiving elements (such as photodiodes) serving as the sensor section 210 as will be described in detail later with reference to FIG. 2A and FIG. 2B. With the plurality of light receiving elements receiving light (such as a laser beam) from a light emitting element (such as a light emitting diode (LED)) provided outside, a position and/or a direction of the HMD 200 (the head of the user) in a three-dimensional space of the real world is identified. For a second tracking scheme, the HMD 200 is provided with a plurality of light emitting elements (LEDs) as will be described in detail later with reference to FIG. 3A and FIG. 3B. The position and/or direction of the HMD 200 is identified with an external image capturing section capturing an image with light from the plurality of light emitting elements. A third tracking scheme uses a motion sensor, provided to the sensor section 210, to identify the position and/or direction of the HMD 200. For example, the motion sensor can be implemented by an acceleration sensor, a gyro sensor, or the like. For example, the position and/or direction of the HMD 200 in the three-dimensional space in the real world can be identified with a 6-axis motion sensor including a 3-axis acceleration sensor and a 3-axis gyro sensor. The position and the direction of the HMD 200 may be identified with a combination of the first tracking scheme and the second tracking scheme, a combination of the first tracking scheme and the third tracking scheme, or the like. A tracking process of directly identifying the point-of-view position and/or line-of-sight direction of the user may be employed, instead of a tracking process of identifying the position and/or direction of the HMD 200 to identify the point-of-view position and/or line-of-sight direction of the user.

For example, the display section 220 of the HMD 200 can be implemented by an organic electroluminescence display (OEL), a liquid crystal display (LCD), or the like. For example, the display section 220 of the HMD 200 is provided with a first display or a first display area set to be in front of the left eye of the user, and a second display or a second display area set to be in front of the right eye of the user, whereby stereoscopic display can be provided. When the stereoscopic display is provided, for example, a left-eye image and a right-eye image of different parallaxes are generated to be respectively displayed on the first and the second displays. Alternatively, the left-eye image and the right-eye image are respectively displayed on the first and the second display areas of a single display. The HMD 200 is provided with two eyepieces (fish-eye lenses) for the left-eye and the right-eye so that a VR space can be provided entirely over the field of view of the user. A correction process is performed for the left-eye image and the right-eye image to correct distortion produced in an optical system such as the eyepiece. This correction process is performed by a display processing section 120.

The processing section 240 of the HMD 200 performs various processes required in the HMD 200. For example, the processing section 240 performs a control process for the sensor section 210, a display control process for the display section 220, or the like. The processing section 240 may perform a three-dimensional acoustic (stereophonic sound) process to simulate direction, distance and spreading of sound in three dimensions.

A sound output section 192 outputs sound generated in accordance with the present embodiment, and can be implemented by a speaker, a headphone, or the like.

An interface (I/F) section 194 performs an interface process for a portable information storage medium 195. The function of the I/F section 194 can be implemented by an application specific integrated circuit (ASIC) for the I/F process. The portable information storage medium 195 is a storage device that stores various types of information from the user, and holds the information without power supply. The portable information storage medium 195 can be implemented by an integrated circuit (IC) card (memory card), a universal serial bus (USB) memory, a magnetic card, or the like.

The communication section 196 communicates with external apparatuses (other devices) through a wired or wireless network. The function of the communication section 196 can be implemented by a communication ASIC, hardware such as a communication processor, or a communication firmware.

The program (data) for causing the computer to function as the sections according to the present embodiment may be distributed to the information storage medium 180 (or the storage section 170) from an information storage medium of a server (host device) through a network and the communication section 196. The scope of the present disclosure can include such a configuration where the information storage medium of the server (host device) is used.

The processing section 100 (processor) performs a game process (simulation process), a virtual space setting process, a moving body process, a virtual camera control process, a display process, or a sound process based on operation information from the operation section 160, tracking information on the HMD 200 (information on at least one of the position and direction of the HMD, information on at least one of the point-of-view position and line-of-sight direction), a program, and the like.

Processes (functions) according to the present embodiment performed by sections of the processing section 100 can be implemented by a processor (processor including hardware). For example, the processes according to the present embodiment can be implemented by a processor that operates based on information such as a program and a memory that stores the information such as the program. For example, the processor may implement the functions of the sections in discrete hardware or in integrated hardware. For example, the processor may include hardware, and the hardware may include at least one of a circuit that processes a digital signal and a circuit that processes an analog signal. For example, the processor may include one or a plurality of circuit devices (such as an IC for example) or one or a plurality of circuit elements (such as a resistor and a capacitor) mounted on a circuit board. For example, the processor may be a central processing unit (CPU). However, the processor is not limited to the CPU, and various processors such as a graphics processing unit (GPU) or a digital signal processor (DSP) may be used. The processor may be a hardware circuit such as an ASIC. The processor may include an amplifier circuit, a filter circuit, or the like that processes an analog signal. The memory (storage section 170) may be a semiconductor memory such as a static random access memory (SRAM) and a DRAM or may be a resistor. Furthermore, the memory may be a magnetic storage device such as a hard disk device (HDD) or may be an optical storage device such as an optical disc device. For example, the memory stores a computer-readable command, and the processes (functions) of the sections of the processing section 100 are implemented by the processor executing the command. This command may be a set of commands forming a program, or may be a command for instructing an operation to a hardware circuit of the processor.

The processing section 100 includes an input processing section 102, a calculation processing section 110, and an output processing section 140. The calculation processing section 110 includes an information acquisition section 111, a virtual space setting section 112, a moving body processing section 113, a virtual camera control section 114, a game processing section 115, a control section 117, a display processing section 120, and a sound processing section 130. As described above, the processes according to the present embodiment performed by these sections may be implemented by a processor (or a processor and a memory). Various modifications may be made with some of these components (sections) omitted, or another component added.

The input processing section 102 performs an input process including: a process of receiving operation information or tracking information; a process of reading information from the storage section 170; and a process of receiving information through the communication section 196. For example, the input processing section 102 performs an input process including: a process of acquiring operation information input by a user using the operation section 160 and tracking information detected by the sensor section 210 of the HMD 200; a process of reading information, designated with a readout command, from the storage section 170; and a process of receiving information from an external apparatus (such as a server) through a network. The receiving process described here includes a process of instructing the communication section 196 to receive information, acquiring the information received by the communication section 196, and writing the information to the storage section 170.

The calculation processing section 110 performs various calculation processes. For example, the calculation processing section 110 performs calculation processes such as an information acquisition process, a virtual space setting process, a moving body process, a virtual camera control process, a game process (simulation process), a display process, or a sound process.

The information acquisition section 111 (a program module for an information acquisition process) performs an acquiring process for various types of information. For example, the information acquisition section 111 acquires position information of the user wearing the HMD 200. The information acquisition section 111 may acquire direction information, posture information, motion information, or the like of the user.

The virtual space setting section 112 (a program module for a virtual space setting process) performs a setting process of a virtual space (object space) where an object is disposed. For example, a process of setting an arrangement of various objects (an object formed by a primitive surface such as a polygon, a free-form surface or a subdivision surface) representing various display objects such as a moving body (such as a car, a person, a robot, a train, an aircraft, a boat, a monster, or an animal), a map (terrain), a building, audience seats, a course (road), an item, woods, a wall, and a water surface in the virtual space is performed. Specifically, a position and a rotational angle (that is the same as an orientation or a direction) of an object in a world coordinate system are determined, and the object is arranged at the position (X, Y, Z) at the rotational angle (rotational angles about X, Y, and Z axes). Thus, the object information storage section 172 of the storage section 170 stores object information in association with an object number. The object information includes information about a position, a rotational angle, a movement speed, a moving direction, or the like of an object (part object) in the virtual space. Examples of the process performed by the virtual space setting section 112 include updating the object information by a frame by frame basis.

The moving body processing section 113 (a program module for a moving body process) performs various processes for a moving body that moves in a virtual space. For example, a process of moving the moving body in a virtual space (object space, game space) or a process of causing the moving body to make an action is performed. For example, the moving body processing section 113 performs a control process based on the operation information input by the user using the operation section 160, the acquired tracking information, a program (movement/operation algorithm), and various types of data (motion data), and the like. The control process includes moving the moving body (model object) in the virtual space and causing the moving body to make an action (motion, animation). Specifically, a simulation process is performed to sequentially obtain movement information (position, rotational angle, speed, or acceleration) and action information (a position and a rotational angle of a part object) of the moving body on a frame (for example, 1/60 seconds) by frame basis. The frame is a unit of time for performing a movement/action process (simulation process) of the moving body and an image generation process. The moving body is, for example, a user moving body corresponding to a user (player) in the real space. For example, the moving body is a user character (avatar, player character) in the virtual space corresponding to the user in the real space, or a moving body (ridden moving body, operated moving body) ridden (operated) by the user character.

The virtual camera control section 114 (a program module for a virtual camera control process) controls a virtual camera. For example, the virtual camera is controlled by a process based on the operation information input by the user using the operation section 160 and the tracking information.

For example, the virtual camera control section 114 controls the virtual camera set as a first-person point-of-view or a third-person point-of-view of the user. For example, the virtual camera is set to be at a position corresponding to the point of view (first-person point-of-view) of the user moving body moving in the virtual space, and the point-of-view position and/or line-of-sight direction of the virtual camera is set to control the position (position coordinates) and/or the orientation (a rotational angle about a rotation axis) of the virtual camera. Alternatively, the virtual camera is set to a position of the point of view (third-person point-of-view) for following the moving body (user character, ridden moving body) and the point-of-view position and/or line-of-sight direction of the virtual camera is set, whereby the position and the orientation of the virtual camera are controlled.

For example, the virtual camera control section 114 controls the virtual camera to follow a change in the point of view of a user based on tracking information on the point-of-view information of the user acquired by point-of-view tracking. For example, in the present embodiment, tracking information (point-of-view tracking information) on point-of-view information that is at least one of the point-of-view position and line-of-sight direction of the user is acquired. For example, the tracking information can be acquired by performing a tracking process for the HMD 200. The virtual camera control section 114 changes the point-of-view position and/or line-of-sight direction of the virtual camera based on the acquired tracking information (information on at least one of the point-of-view position and line-of-sight direction of the user). For example, the virtual camera control section 114 sets the virtual camera so that the point-of-view position and/or line-of-sight direction (position, orientation) of the virtual camera in the virtual space changes in accordance with the change in the point-of-view position and/or line-of-sight direction of the user in the real space. Thus, the virtual camera can be controlled to follow the change in the point of view of the user, based on the tracking information on the point-of-view information of the user.

The game processing section 115 (a program module for a game process) performs various game processes for the user to play the game. In other words, the game processing section 115 (simulation processing section) performs various simulation processes to enable the user to experience virtual reality. Examples of the game processes include a process of starting the game when a game start condition is satisfied, a process of making the started game progress, a process of ending the game when a game end condition is satisfied, and a process of calculating a game result.

The control section 117 (a program module for a control process) performs a control process for the movable chassis 30, or the like. For example, the control section 117 performs a control for changing a play position of the user by the movable chassis 30.

The display processing section 120 (a program module for a display process) performs a display process for a game image (simulation image). For example, a rendering process is performed based on results of various processes (a game process, a simulation process) performed by the processing section 100 to generate an image, and the image is displayed on the display section 220. Specifically, a geometry process such as coordinate transformation (world coordinate transformation, camera coordinate transformation), a clipping process, a perspective transformation, or a light source process is performed, and rendering data (coordinates of the vertex position of the primitive surface, texture coordinates, color data, a normal vector, an α value, or the like) is generated based on a result of the process. An object (one or a plurality of primitive surfaces) after the perspective transformation (after the geometry process) is rendered in the rendering buffer 178 (a buffer such as a frame buffer, or a work buffer that can store image information in a unit of pixels), based on the rendering data (primitive surface data). Thus, an image as viewed from the virtual camera (a given point of view, a left-eye, right-eye, first, or second point of view) in the virtual space is generated. The rendering process performed by the display processing section 120 can be implemented by a vertex shader process, a pixel shader process, or the like.

The sound processing section 130 (a program module for a sound process) performs a sound process based on results of various processes performed by the processing section 100. Specifically, game sound such as a song (music, background music (BGM)), a sound effect, or a voice is generated to be output by the sound output section 192. A part (three-dimensional acoustic process for example) of the sound process performed by the sound processing section 130 may be implemented by the processing section 240 of the HMD 200.

The output processing section 140 performs an output process of outputting various types of information. For example, the output processing section 140 performs the output process including: a process of writing information to the storage section 170; and a process of transmitting information through the communication section 196. For example, the output processing section 140 performs a process of writing information, designated by a write command, to the storage section 170, and a process of transmitting information to an external apparatus (such as a server) through a network. This transmission process is a process of instructing the communication section 196 to transmit information, and a process of designating the information to be transmitted to the communication section 196.

The simulation system according to the present embodiment includes the information acquisition section 111, the virtual space setting section 112, the moving body processing section 113, the game processing section 115, and the display processing section 120, as illustrated in FIG. 1.

The information acquisition section 111 acquires the user information including at least one of the position information, direction information, and posture information of the user. For example, the information acquisition section 111 acquires the user information (user tracking information) including at least one of the position information, direction information, and posture information of the user in the real space based on tracking information from the HMD 200 or tracking information from a tracking device (such as a tracking device 250 or 260 described later) mounted on a predetermined body part (such as a hand, leg, head or the like) of the user. The position information may be position information on the point of view of the user in the real space, and the direction information may be direction information on the line-of-sight of the user in the real space. When the user plays in a field (a play field, a simulation field, a play area) or on the movable chassis 30 in the real space (real world), the position information and the direction information may be position information and direction information (position coordinates in a coordinate system with an origin point at a given position, a rotational angle about each coordinate axis) in the filed or on the movable chassis 30. The posture information is information for identifying a posture (such as a standing posture, a squatting posture, or a sitting posture) of the user, or for identifying a position and/or a direction of each body part (such as a torso, head, hand, or leg) of the user. The posture information may be information identified by the tracking information from the tracking device worn on the predetermined body part of the user, or may be information identified by motion tracking such as Kinect (registered trademark). For example, the user information can include body part information including at least one of the position information and direction information of the predetermined body part of the user. Furthermore, the information acquisition section 111 may acquire position information and/or direction information of the HMD 200 as the position information and/or direction information of the user wearing the HMD 200, or may acquire position information and/or direction information of the tracking device worn on the predetermined body part of the user as the position information and/or direction information of the predetermined body part of the user.

The virtual space setting section 112 performs a setting process of the virtual space. For example, the virtual space setting section 112 performs a process of setting an arrangement of an object such as a moving body, an item, a course object, a background object, or a map object in the virtual space. For example, the virtual space setting section 112 performs a process of setting an arrangement of the moving body that moves based on the operation information from the operation section 160 in the virtual space. Furthermore, the virtual space setting section 112 performs a process of setting an arrangement of the item serving as an acquisition target in an item area set to the course on which the moving body moves. The information on the position, direction or the like of the object such as the moving body and the item is stored in the object information storage section 172, for example.

The moving body processing section 113 performs a process of moving the moving body in the virtual space (game space) set by the virtual space setting section 112. For example, the moving body processing section 113 performs a process of moving the user character, corresponding to the user, in the virtual space. For example, the moving body processing section 113 moves the user character in the virtual space based on the user information acquired by the information acquisition section 111 or the operation information from the operation section 160. At this time, the moving body processing section 113 may move the user character itself or the moving body ridden by the user character in the virtual space so that the user character moves to follow the moving body in the virtual space.

The game processing section 115 performs processes for the game in the virtual space. The game processing section 115 performs various processes for the user to play the game in the virtual space.

The display processing section 120 performs a process of generating an image in the virtual space as a display image to be displayed for the user. For example, the display processing section 120 generates an image seen from the virtual camera in the virtual space as a display image to be displayed for the user. Specifically, the display processing section 120 generates the image in the virtual space as a display image on the HMD 200 worn by the user to cover his/her field of view. For example, the virtual camera control section 114 performs a control process of the virtual camera corresponding to the point of view of the user wearing the HMD 200. For example, the virtual camera control section 114 controls the virtual camera set as a first-person point-of-view of the user. For example, the virtual camera is set to be at a position corresponding to the point of view of the user character in the virtual space, and the point-of-view position and/or the line-of-sight direction of the virtual camera is set to control the position (position coordinates) and/or orientation (a rotational angle about a rotation axis) of the virtual camera. The display processing section 120 then generates an image as viewed from the virtual camera (user point of view) in the virtual space as a display image (display video) on the HMD 200 and the like. For example, an image as viewed from a given point of view in the object space of the virtual space is generated. The generated image is a stereoscopic image, for example. As a result, an image of the virtual space (VR space) spreading over the entire field of view can be displayed on the HMD 200.

According to the present embodiment, the game processing section 115 determines whether the user has made an item acquisition motion based on the user information. For example, the game processing section 115 determines whether the user has made the item acquisition motion based on the body part information of at least one of the position information and direction information of the predetermined body part such as a hand of the user. When the game processing section 115 determines that the user has made the item acquisition motion, the game processing section 115 performs a process of causing the user character to acquire the item. For example, the game processing section 115 performs a process of registering the item as a possessed item by the user character. For example, the game processing section 115 performs a process of storing the item in the storage section 170 (object information storage section 172) in association with information of the user character. For example, the game processing section 115 registers the item as part of the user character so as to be possessed. When the predetermined body part used to acquire the item is a hand, the game processing section 115 connects an item object to a hand object to cause the item to follow a bone of the hand in the motion data.

The game processing section 115 also performs a process of canceling an item possessing state of the user character. For example, the game processing section 115 determines whether the user, who was in a basic posture state (normal operating state in a narrow sense), has made the item acquisition motion based on the user information. When the game processing section 115 determines that the user has made the item acquisition motion, the game processing section 115 performs a process of causing the user character to acquire the item. Then, when the game processing section 115 determines that the user has restored the basic posture state after the user character acquired and possessed the item, the game processing section 115 cancels the item possessing state of the user character. That is to say, when the user restores the basic posture state with the item possessed, registration of acquisition and possession of the item is canceled, so that the item is deleted or not displayed. The basic posture state described here is a posture defined as a basic posture (reference posture, normal posture) of the user in gameplay of a battle game or the like. For example, the basic posture state is a state where the user is in a normal posture with at least one hand down, or the like.

The cancellation of the item possessing state may be achieved at least when the item is in an unconnected state to the body part of the user character, and the item whose possessed state is canceled may be temporarily made unusable and stocked, for example. Then, an item use process may be executable when a use permission condition of the stocked item is satisfied. For example, the stocked item is stored, and when a usable condition is satisfied, the item is connected to the body part of the user character. Then, when the user makes an item use motion, the item use process is executed.

Furthermore, according to the present embodiment, the moving body processing section 113 performs a process of moving the moving body ridden by the user character in the virtual space. As a result, by moving the moving body ridden by the user character in the virtual space, the user character also moves to follow the moving body in the virtual space.

Furthermore, according to the present embodiment, the virtual space setting section 112 sets the item area (sets the item) to a location (item disposing location) that the user character cannot come into contact with (reach) when the user is in the normal operating state. The normal operating state (the basic posture state or the normal posture state in a broad sense) is a state where the user is operating the moving body ridden by the user character without making such a motion as the item acquisition motion, for example. An example of the normal operating state includes a state where the user is operating an operation member such as a steering wheel or an operation lever with both hands. The item is disposed to the location that the user character cannot touch (reach) in such a normal operating state. For example, the item is disposed to a location that the user character cannot touch while operating the operation member such as the steering wheel with both hands.

Then, the game processing section 115 determines whether the user has made the item acquisition motion toward a direction of the item in the item area (a direction of the item disposing location) for example, based on the user information (body part information of the predetermined body part such as a hand). When determining that the user has made the item acquisition motion, the game processing section 115 performs a process of causing the user character to acquire the item. For example, the game processing section 115 performs a process of registering the item as a possessed item by the user character.

Furthermore, the game processing section 115 performs a process of storing the user information on the user in the normal operating state (basic posture state) in the storage section 170. For example, the user takes a posture (basic posture) in the normal operating state at initial setting timing before starting the game, and the body part information of the predetermined body part in this normal operating state is stored, for example, in the initial setting information storage section 174 of the storage section 170 as initial setting information. By storing the body part information in the normal operating state, the body part information of the predetermined body part in the normal operating state in accordance with a physique (physical information) of the user, a position or posture of the user in the movable chassis 30, or the like, is stored in the storage section 170. As a result, by using the body part information of the initial setting information, it is possible to determine whether the user has restored the normal operating state during the game, regardless of the physique of the user, the position or posture of the user in the movable chassis 30, or the like.

Furthermore, the virtual space setting section 112 sets the item area to the course on which the moving body moves. For example, the virtual space setting section 112 sets the item area on the course or at a location along the course in a racing game. As a result, it is possible to set the item area to a location that enables the item acquisition by the character on the moving body in a game such as a racing game in which the moving body moves along the course.

Furthermore, the game processing section 115 determines that the item acquisition motion has been made when the user has made a motion of moving the predetermined body part. For example, the game processing section 115 determines that the item acquisition motion has been made (the item has been acquired) upon determination that the user has made a motion of moving the predetermined body part, and the body part (body part object) of the user character corresponding to the predetermined body part has approached (reached) the item. For example, the game processing section 115 determines that the item acquisition motion has been made upon determination that the predetermined body part of the user has approached in the direction of an item setting location and has hit the item. Specifically, the game processing section 115 performs a hit determination process (crossing determination, collision process) between a hit volume set to the body part of the user character (body part corresponding to the predetermined body part) (or the predetermined body part itself) and a hit volume set to the item (or the item itself). When the hit volume process results in a hit determination, the game processing section 115 determines that the item acquisition motion has been made. Alternatively, the game processing section 115 determines that the item acquisition motion has been made when a distance between the body part of the user character and the item becomes equal to or shorter than a given distance. The predetermined body part described herein is a body part used for the item acquisition motion, such as a hand, leg, or head of the user. The body part of the user character is a body part (part object) corresponding to the predetermined body part of the user, such as a hand, leg, or head of the user character.

Furthermore, the game processing section 115 executes the item use process when determining that the user has made the item use motion. For example, the game processing section 115 executes the item use process upon determination that the user has made the item use motion using the predetermined body part, with the item acquired and possessed by the user character, based on the user information (body part information). The item use process is a process of moving the item possessed by the user character or exhibiting an effect of the item, for example. Specifically, the item use process includes a process of moving the item possessed by the user character by throwing or swinging, a process of displaying an effect image caused by the item, and a process of exhibiting an effect of the item such as giving damage due to a hit of the item to a target (target object) such as an enemy moving body, changing a moving state of the target by the item, changing various game parameters of the target, or the like.

Furthermore, the information acquisition section 111 acquires the body part information including at least one of the position information and direction information of the predetermined body part as the user information. For example, when the user moves the predetermined body part, the tracking device or the like worn on the predetermined body part tracks the position and/or direction of the predetermined body part, and the information acquisition section 111 acquires the tracking information thus acquired by tracking as the body part information. Then, the virtual space setting section 112 sets an arrangement of the body part (part object representing a body part such as a hand, leg, or head) of the user character, corresponding to the predetermined body part, in the virtual space based on the body part information. For example, the virtual space setting section 112 sets an arrangement of the body part of the user character at a position and/or in a direction corresponding to the position and/or direction of the predetermined body part of the user in the real space. That is, the virtual space setting section 112 moves the body part of the user character in linkage with the predetermined body part of the user. Then, the display processing section 120 performs a process of displaying the body part arranged and set in the virtual space. For example, when the user moves the predetermined body part in the real space, the body part of the user character moves correspondingly to the motion of the predetermined body part, and the display processing section 120 displays a moving image of the body part on the display section such as the HMD 200.

Furthermore, the moving body processing section 113 performs a process of moving the item in a moving direction of the moving body during the item acquisition by the user character. For example, when it is determined that the body part of the user character has approached the item, the moving body processing section 113 moves the item in a direction corresponding to the moving direction of the moving body ridden by the user character (a moving direction of the user character). A movement speed of the item in such a case is, for example, equal to or lower than a movement speed of the moving body. A setting of the movement speed of the item may be changed depending on a game level or a handicap setting of the user. As a result, by moving the item in linkage with the movement of the moving body, the item acquisition can be simplified.

Furthermore, the moving body processing section 113 performs a process of moving the acquired item. For example, the moving body processing section 113 performs a process of moving the item acquired and possessed by the user character to follow the movement of the moving body (user character). For example, by registering the item as part of the user character, the item becomes subordinate to the user character. Accordingly, when the moving body ridden by the user character moves, the item also moves correspondingly to the movement of the moving body.

Furthermore, the game processing section 115 executes the item use process upon determination that the user has made the item use motion, with the item acquired and possessed by the user character, based on the user information. For example, the game processing section 115 executes the item use process to execute the process of moving the item by throwing or swinging, or the process of exhibiting the effect of the item, when determining that the user has made a motion like using the item based on the user information including the position information, direction information, and posture information of the user.

In this case, the game processing section 115 executes the item use process in accordance with at least one of a motion direction of the item use motion, intensity of the item use motion, a type of the item, line-of-sight information of the user during the item use motion, and a state of the predetermined body part of the user used to make the item use motion. For example, the game processing section 115 determines whether to execute the item use process or sets execution details in accordance with these motion direction, intensity, type, line-of-sight information, or state of the predetermined body part. The motion direction of the item use motion is a direction of a motion made by the user for moving the item by throwing or swinging. The intensity of the item use motion is intensity of a motion represented by speed or acceleration of the motion made by the user for moving the item by throwing or swinging. The type of the item represents a classification of the item acquired by the user character. For example, a shape or an image of the item, or an effect exhibited in the item use process changes depending on the type of the item. The line-of-sight information of the user in the item use motion is a direction in which the line of sight of the user is directed when the user is making a motion for throwing the item, or the like. For example, when the user makes a throwing motion for throwing the item while directing the line-of-sight in a predetermined direction such as an upward direction, the item is moved in the direction of the line of sight. The state of the predetermined body part of the user in the item use motion is a state of a direction (posture, rotational angle about a predetermined coordinate axis) and/or a position of the predetermined body part during the item use motion. For example, the game processing section 115 determines whether to perform the item use motion or determines the moving direction of the item by the item use motion, depending on the state of the direction of the predetermined body part or the like.

Furthermore, the game processing section 115 cancels the item possessing state of the user character when a given condition is satisfied, with the item acquired and possessed by the user character. For example, when the given condition is satisfied, with the item possessed by the user character, the registration of the acquisition and possession of the item is canceled and the possessed item is, for example, deleted so as not to be displayed.

The given condition for canceling the item possessing state is satisfied when a given time period has elapsed since the user character acquired (possessed) the item, a specific game situation occurs, or the user restores the normal operating state (basic posture state) as described above, for example. The specific game situation is a predetermined specific situation in a game such as a collision or a jump of the moving body.

Furthermore, the game processing section 115 performs a notification process of the item acquisition. For example, when the item is acquired, the game processing section 115 performs the notification process of notifying of the item acquisition by an image, sound or vibration. The notification process is executed by the notification processing section 116 of the game processing section 115. For example, when the item is acquired, the notification processing section 116 performs a process of changing an image of the item or an image of a display object around the item, outputting a specific game sound (sound effect) for notifying of the item acquisition, or vibrating the operation section 160 or the movable chassis 30. For example, the notification process can be implemented by various experience devices (experience devices by sound, vibration, air gun, light, or the like) disposed to the movable chassis 30.

Furthermore, the virtual space setting section 112 may set a disposing location of the item in accordance with the physical information of the user. For example, the virtual space setting section 112 changes the item disposing location in accordance with the physical information of the user such as a size of a physique. For example, the virtual space setting section 112 disposes the item at a higher location for an adult user (taller user), and at a lower location for a child user (shorter user). Alternatively, the virtual space setting section 112 may set the item disposing location in accordance with a length of the predetermined body part such as a hand of the user. Alternatively, the virtual space setting section 112 may set the item disposing location in accordance with information on sex, age, or the like of the user. The physical information of the user may be set initially by input from the user before a start of the game, or may be automatically acquired by a sensor or the like. The acquisition process of the physical information is performed by the information acquisition section 111 for example.

Furthermore, according to the present embodiment, the display processing section 120 generates, as the display image, a display image for the HMD 200 worn by the user to cover the field of view of the user. When the user wears the HMD 200 to cover the field of view, it is effective in improving the virtual reality for the user that the user character is enabled to acquire the item when the user makes the item acquisition motion. However, the display processing section 120 may generate a display image for a display section other than the HMD 200. For example, the display processing section 120 may generate a display image for a display section such as a television used for a consumer game apparatus, or a monitor display for a personal computer or an arcade game apparatus.

Furthermore, according to the present embodiment, a virtual reality simulation process is performed as a game process for the game played by the user. The virtual reality simulation process is a simulation process of simulating a real space event in the virtual space, and is for enabling the user to virtually experience the event. For example, the virtual reality simulation process includes a process of moving the moving body such as the user character corresponding to the user in the real space or its ridden moving body in the virtual space, and a process for enabling the user to experience a change in an environment or surroundings due to the movement.

A process performed by the simulation system according to the present embodiment illustrated in FIG. 1 can be implemented by a processing apparatus such as an arcade game apparatus and a consumer game apparatus, a processing apparatus such as a personal computer (PC) installed in a facility, a processing apparatus (backpack PC) worn by the user on his/her back, or by processes performed by these processing apparatuses in cooperation. Alternatively, the process performed by the simulation system according to the present embodiment may be implemented by a server system and a terminal device. For example, the process may be implemented as a process performed by the server system and the terminal device in cooperation.

2. Tracking Process

Next, an example of a tracking process is described. FIG. 2A illustrates an example of the HMD 200 used in the simulation system according to the present embodiment. As illustrated in FIG. 2A, the HMD 200 is provided with a plurality of light receiving elements (photodiodes) 201, 202, and 203. The light receiving elements 201 and 202 are provided on the front surface side of the HMD 200, whereas the light receiving element 203 is provided on the right side surface of the HMD 200. Note that unillustrated light receiving elements are further provided on the left side surface, the upper surface, or the like of the HMD.

A user US wears tracking devices 250 and 260 on his/her hands each serving as a predetermined body part. One of the tracking device 250 worn on the right hand is provided with a plurality of light receiving elements 251 to 254 as in the case of the HMD 200. The other tracking device 260 worn on the left hand is also provided with a plurality of light receiving elements 261 to 264 (not illustrated). With these tracking devices 250 and 260 provided with the light receiving elements, the body part information such as positions or directions of the predetermined body parts such as the hands can be identified, as in the case of the HMD 200. The predetermined body parts of the user US on which the tracking devices are worn are not limited to the hands (backs of the hands), but may be various body parts such as a leg, head, chest, torso, or waist.

As illustrated in FIG. 2B, base stations 280 and 284 are installed in a periphery of the movable chassis 30. The base station 280 is provided with light emitting elements 281 and 282, and the base station 284 is provided with light emitting elements 285 and 286. For example, the light emitting elements 281, 282, 285, and 286 are implemented by LEDs that emit laser beams (such as infrared laser beams). The base stations 280 and 284 radially emit laser beams by using the light emitting elements 281, 282, 285, and 286, for example. With the light receiving elements 201 to 203 provided to the HMD 200 as illustrated in FIG. 2A and the like receiving the laser beams from the base stations 280 and 284, the tracking process of the HMD 200 is implemented, so that a position and/or a facing direction of the head of the user US (point-of-view position, line-of-sight direction) can be detected. For example, the position information and/or posture information (direction information) of the user US can be detected.

With the light receiving elements 251 to 254 and 261 to 264 provided to the tracking devices 250 and 260 receiving the laser beams from the base stations 280 and 284, at least one of the position and direction of each hand (predetermined body part in a broad sense) of the user US can be detected.

Figure 3A:
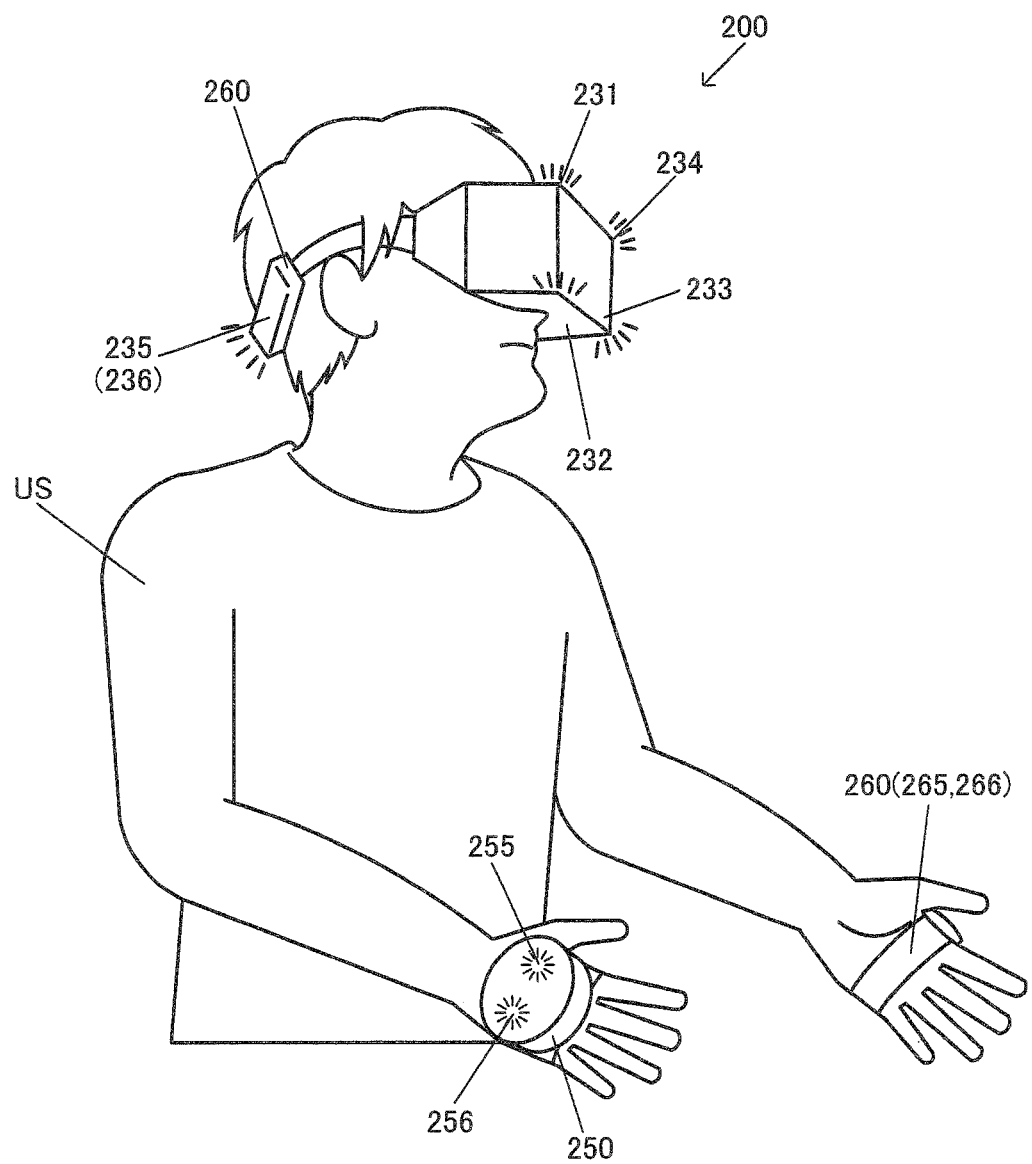
FIG. 3A and FIG. 3B are diagrams illustrating another example of the tracking process for the HMD.

FIG. 3A illustrates another example of the HMD 200. The HMD 200 illustrated in FIG. 3A is provided with a plurality of light emitting elements 231 to 236. For example, these light emitting elements 231 to 236 are implemented by LEDs or the like. The light emitting elements 231 to 234 are provided on the front surface side of the HMD 200, and the light emitting element 235 and the light emitting element 236 (not illustrated) are provided on the back surface side. These light emitting elements 231 to 236 emit light in a wavelength band of visible light (light emission) for example. Specifically, the light emitting elements 231 to 236 emit light of colors different from each other. The tracking device 250 worn on the hand (predetermined body part) of the user US is provided with light emitting elements 255 and 256, and the tracking device 260 is provided with light emitting elements 265 and 266 (not illustrated).

Figure 3B:
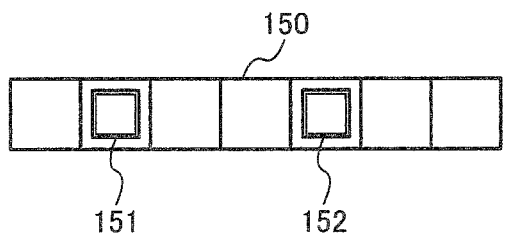

An image capturing section 150 illustrated in FIG. 3B is installed in at least one place around the user US (for example, a front side or a front side and back side) to capture images of light from the light emitting elements 231 to 236 of the HMD 200. Thus, the captured image obtained by the image capturing section 150 includes spots of the light from the light emitting elements 231 to 236. The head (HMD) of the user US is tracked with image processing executed on the captured image. Thus, the three-dimensional position and/or facing direction of the head of the user US (the point-of-view position, the line-of-sight direction) is detected.

For example, as illustrated in FIG. 3B, the image capturing section 150 is provided with first and second cameras 151 and 152. The position of the head of the user US in a depth direction and the like can be detected by using first and second captured images respectively captured by the first and the second cameras 151 and 152. Based on motion detection information obtained by the motion sensor provided at the HMD 200, a rotational angle (line-of-sight) of the head of the user US can also be detected. Therefore, using the HMD 200 makes it possible to, even when the user US is oriented in any of all the 360-degree directions around the user US, display an image in the virtual space (virtual three-dimensional space) corresponding to the direction (seen from the virtual camera corresponding to the point of view of the user) on the display section 220 of the HMD 200.

Furthermore, it is possible to detect at least one of the position and direction of each hand (right hand, left hand) of the user US, as in the case of the HMD 200, by capturing images of the light from the light emitting elements 255 and 256 of the tracking device 250 and the light from the light emitting elements 265 and 266 of the tracking device 260 by the image capturing section 150.

LEDs emitting infrared light, instead of the visible light, may be used as the light emitting elements 231 to 236, 255, 256, 265, and 266. Furthermore, another method such as one using a depth camera may be employed to detect the position and/or motion of the head or hands (predetermined body parts) of the user and the like.

The method of the tracking process for detecting the position information and/or posture information of the user US or the hands (predetermined body parts) of the user US is not limited to that described with reference to FIGS. 2A to 3B. For example, the position information, direction information, and/or posture information may be detected by performing the tracking process of the HMD 200 or the tracking devices 250 and 260 using a motion sensor or the like provided to the HMD 200 or the tracking devices 250 and 260. Thus, the tracking process may be implemented without an external device such as the base stations 280 and 284 in FIG. 2B and the image capturing section 150 in FIG. 3B. Alternatively, various point-of-view tracking processes such as known eye tracking, face tracking, or head tracking can be employed. Alternatively, a motion tracking process of detecting and identifying a motion (motion data) of the user may be used.

3. Movable Chassis

Figure 4:
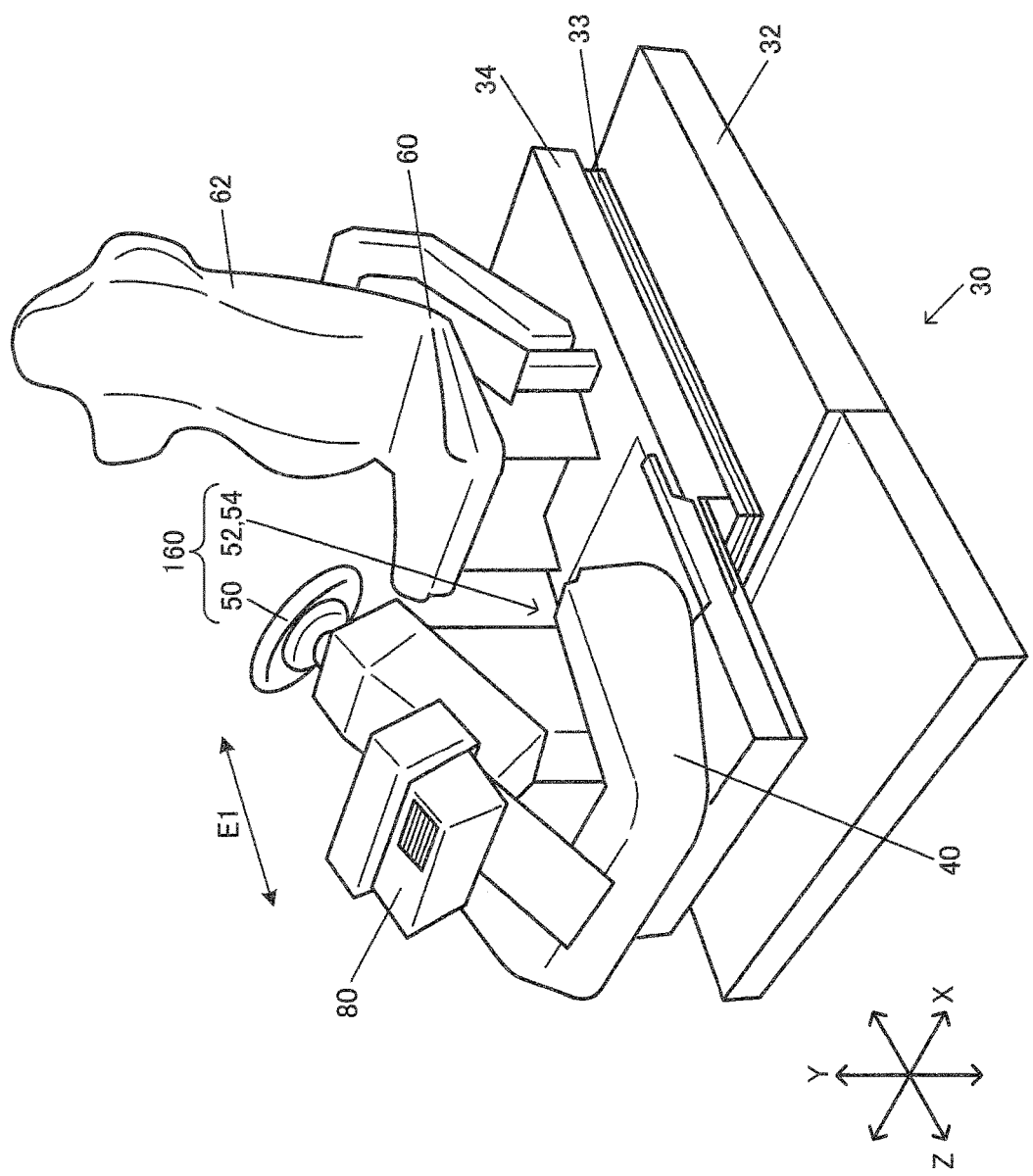
FIG. 4 is a perspective view of a configuration example of a movable chassis according to the present embodiment.

Next, a configuration example of the movable chassis 30 according to the present embodiment is described. FIG. 4 is a perspective view of the movable chassis 30.

The movable chassis 30 illustrated in FIG. 4 has a cover section 33 and a base section 34 (pedestal section) provided over a bottom section 32 in this order. The base section 34 is provided to face the bottom section 32.

The base section 34 is provided with a ride section 60 including a seat 62. The user US sits on the seat 62 of the ride section 60. The base section 34 is also provided with a movable section 40 having the operation section 160 including the steering wheel 50, the accelerator pedal 52, and the brake pedal 54 (not illustrated). The movable section 40 is also provided with a blower 80 to send air to the user. The blower 80 is implemented by a sirocco fan, for example.

The movable section 40 is movable in front-rear directions as illustrated in FIG. 4 by E1. Specifically, a lever (not illustrated) for unlocking the movement is provided, and when the user operates the lever, the movable section 40 is unlocked to move. The user can move the movable section 40 in ten stages at an interval of 2 cm in the directions indicated by E1. As a result, the operation section 160 such as the steering wheel 50 can be adjusted to an ideal position for the user.

The movable chassis 30 is a chassis (such as an arcade chassis and a cockpit chassis) that changes a play position of the user. For example, the movable chassis 30 changes the play position of the user in accordance with a result (game status) of the game process by the game processing section 115 (processing section 100) in FIG. 1.

For example, the game processing section 115 performs the simulation process of the virtual reality as the game process of the game played by the user. For example, the game processing section 115 performs a process of moving the moving body (such as a car and a robot) in the virtual space, ridden by the user character corresponding to the user in the real space, and a process for enabling the user to experience a change in an environment or surroundings due to the movement. The movable chassis 30 changes the play position based on a result of the simulation process that is the game process. For example, the movable chassis 30 changes the play position based on a result of a movement process of the moving body (or the user character) ridden by the user character in the virtual space. For example, in a racing game, the movable chassis 30 performs a process of changing the play position as a simulation process for enabling the user to feel acceleration or deceleration of a moving car (racing car) or acceleration due to a change in a direction. Alternatively, the movable chassis 30 performs a process of changing the play position as a simulation process for enabling the user to feel an impact caused when an attack by an opponent hits the car.

The play position described herein is a position of the user playing a virtual reality (VR) simulation game. For example, the play position is a ride position of the user on the ride section 60. For example, when the user is seated on the seat 62 of the ride section 60 while playing the virtual reality simulation game, the play position is a seated position which corresponds to the ride position on the seat 62. When the user straddles a ride section simulating a ride such as a motor cycle or a bicycle, or an animal such as a horse, the play position is a straddling position. In a simulation game played by the user in a standing posture, the play position is the standing position on the ride section for example.

As described above, the simulation system according to the present embodiment includes the movable chassis 30 capable of changing the play position of the user based on a result (game status) of the game process. As a result, changing the play position (ride position) enables the user to experience a change in acceleration due to the movement of the ridden moving body (car, robot) of the user character in the virtual space or the like, thereby improving virtual reality.

Specifically, in FIG. 4, a first to fourth air spring sections (extension/contraction sections in a broad sense) (not illustrated) are disposed between the bottom section 32 and the base section 34 at four corners. The first to fourth air spring sections extend/contract in a Y axis direction in FIG. 4 with air supplied or discharged using an air compressor or bubbles. For example, the base section 34 can be moved upward or downward in the Y axis direction as all the first to fourth air spring sections extend or contract. With these movements of the base section 34 in upward and downward directions, a condition of a road surface of a course can be simulated for example. For example, bumps on the road surface (rough road) can be simulated with the base section 34 quickly moving upward and downward with small strokes.

Of the first to fourth air spring sections at the four corners, those on one of forward and back sides may extend while those on the other side contract so that pitching of the base section 34 about an X axis can be implemented. Of the first to fourth air spring sections at the four corners, those on one of left and right sides may extend while those on the other side contract so that rolling of the base section 34 about a Z axis can be implemented. Performing such pitching and rolling enables the user to feel acceleration, deceleration, and inertia in cornering involved in the movement of the moving body such as a car. As a result, virtual reality for the user can be improved, and what is known as 3D sickness can be suppressed.

4. Method According to the Present Embodiment

Next, a method according to the present embodiment is described. The following description is given mainly based on an example where the method according to the present embodiment is applied to a racing game in which the user character drives a car and competes with another car. However, the game employing the method according to the present embodiment is not limited to this kind of racing game. For example, the method according to the present embodiment can be applied to various games other than the racing game (such as a competition game not involving a car, a robot game, a battle game such as a first person shooter (FPS) or a fighting game, a simulation game for rides such as trains and aircrafts, a roll playing game (RPG), an action game, a virtual experience game, a sport game, a thriller experience game, or a music game), and to something other than games.

4.1 Description on Game

The present embodiment implements a method for implementing the acquisition and use of the item in a natural manner without deteriorating the sense of immersion in the game in which the user operates the moving body in the virtual space. Specifically, according to the present embodiment, in the game in which the user (player) plays in the virtual space, the user operates the moving body (including the user character in the FPS or the like), and a game process of calculating a game status in the virtual space is performed. The position, direction, posture or the like of the user is detected by the HMD or the tracking device. The item area where the item is deposed is set to a location that the user operating the moving body in a normal state cannot reach (come into contact with). The user (avatar) can acquire the item in the item area by making a given motion (movement or approach equal to or larger than a threshold value) toward a direction (upward, downward, right, or left) of the item area. When the given motion (movement or approach equal to or larger than a threshold value) of the user is detected, the user is enabled to acquire the item.

A racing game implemented by such a method according to the present embodiment is described. In this racing game, the user character in the virtual space corresponding to the user in the real space drives a car (racing car) as a driver and competes with an opponent's car. The item area is set to a course, and the user can advantageously play the racing game by acquiring and using the item in the item area.

FIGS. 5A to 9B are examples of game images generated in the present embodiment, and FIGS. 10A to 12B are diagrams illustrating motions of the user in the gameplay.

Figure 5A:
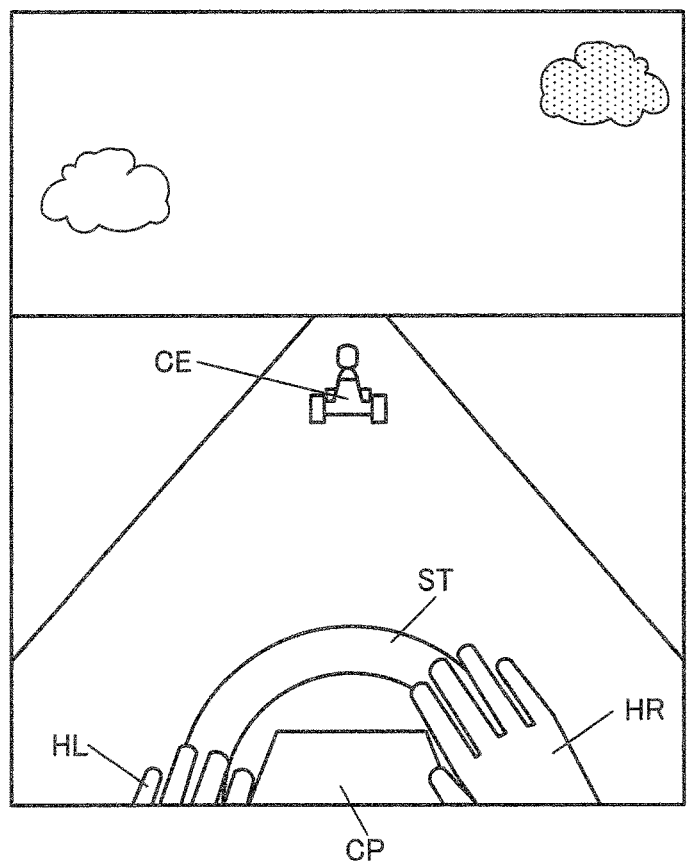
FIG. 5A and FIG. 5B are examples of game images generated according to the present embodiment.
Figure 5B:
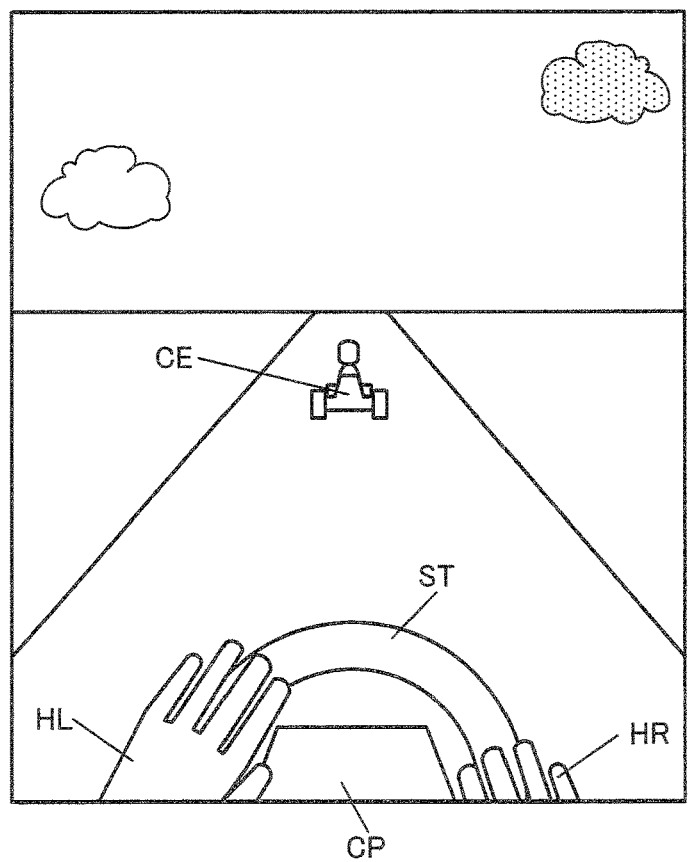
Figure 10A:
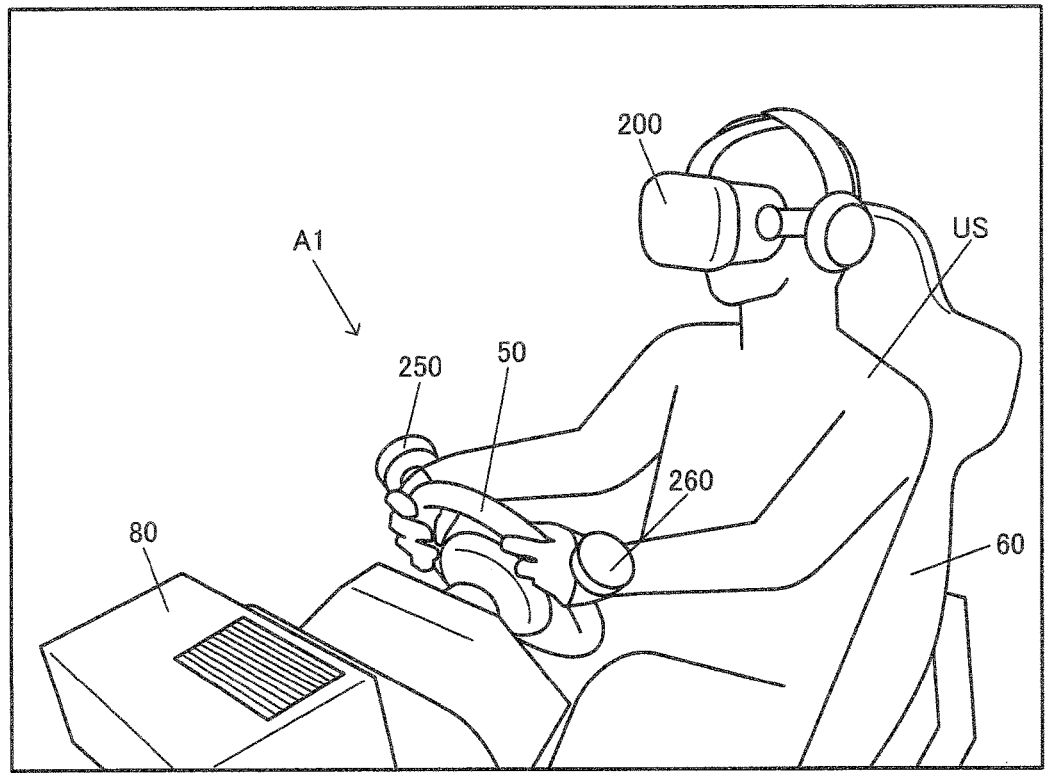
FIG. 10A and FIG. 10B are diagrams illustrating motions of a user in gameplay.

FIG. 10A illustrates the user US in the normal operating state (basic posture state) who is driving the car with both right and left hands holding the steering wheel 50 as indicated by A1. In this case, game images as illustrated in FIG. 5A and FIG. 5B are displayed on the HMD 200 of the user US. These game images include a user's car CP (moving body in a broad sense) and an opponent's car CE (opponent's moving body) running on the course in the virtual space. In addition, the game images also include a steering wheel ST of the car CP, the hands HR and HL (body parts) of the user character (player character) operating the steering wheel ST.

When the user US in the real space in FIG. 10A turns the steering wheel 50 to the left, a game image in which the steering wheel ST of the car CP is also turned to the left by the hands HR and HL of the user character in the virtual space is displayed as illustrated in FIG. 5A. When the user US in the real space turns the steering wheel 50 to the right, a game image in which the steering wheel ST is also turned to the right by the hands HR and HL of the user character in the virtual space is displayed as illustrated in FIG. 5B. That is, there is displayed a game image in which the hands HR and HL of the user character in the virtual space move in linkage with the motion of the hands of the user US in the real space. As a result, the user US is enabled to feel the virtual reality as if he/she were driving a real car.

In the racing game in the present embodiment, the item is disposed in the item area along the course. For example, an item BM of a bomb attached to a balloon BAL appears in front of the car CP driven by the user character in FIG. 6A.

Figure 10B:
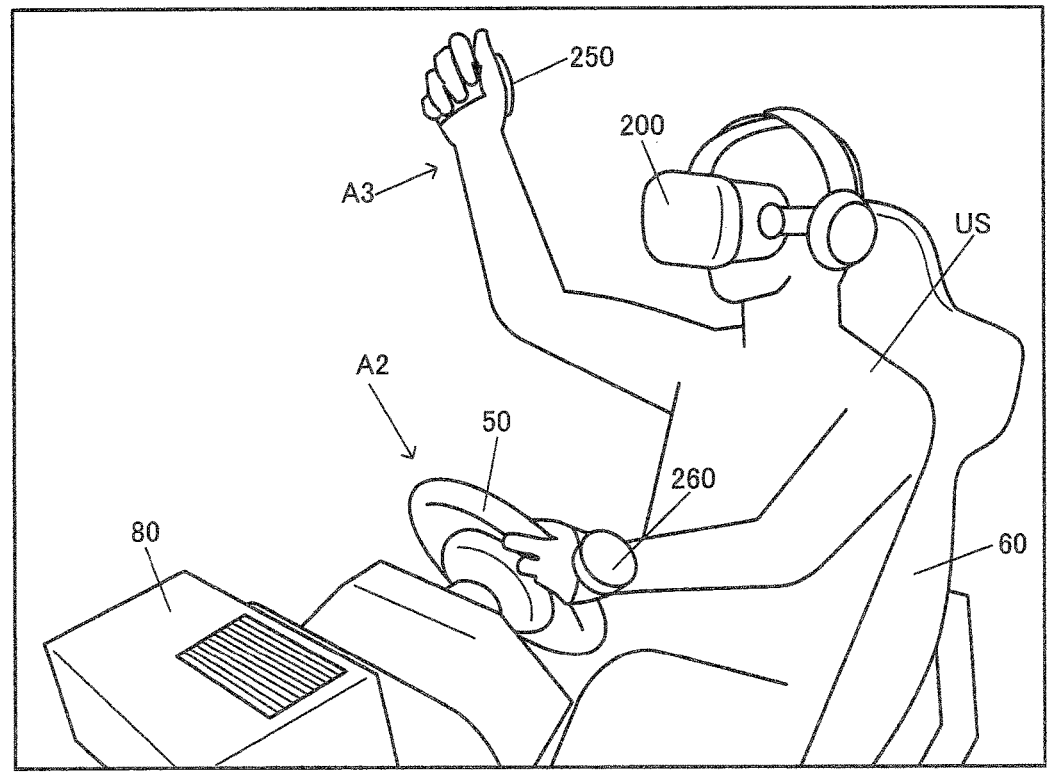

The user US in the real space, for example, takes the right hand off the steering wheel 50 as indicated by A2 in FIG. 10B and raises it upward as indicated by A3 in order to acquire the item BM. The position and/or direction information of the right hand is acquired by the tracking device 250 as the body part information of the hand.

Figure 6A:
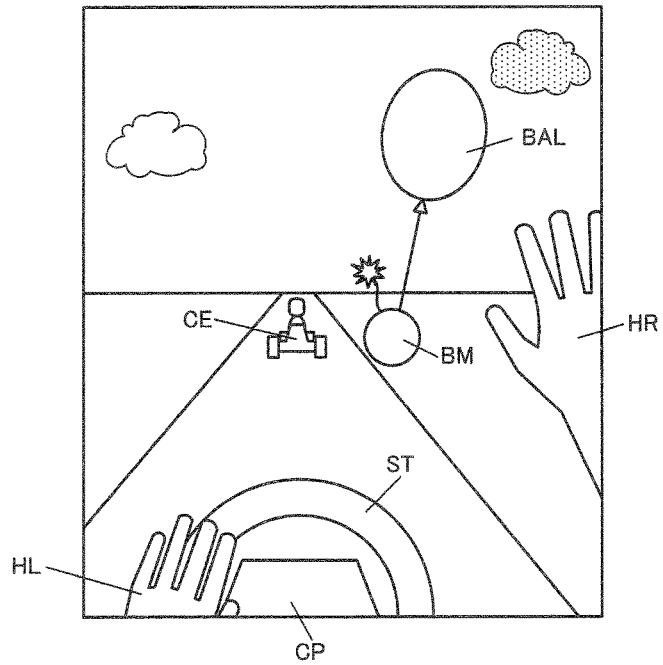
FIG. 6A and FIG. 6B are examples of game images generated according to the present embodiment.

When the user US raises his/her hand in the real space, the user character in the virtual space also raises its hand HR as illustrated in FIG. 6A. That is, the position and/or direction of the hand of the user US is detected by the tracking device 250 as described above, and the position and/or direction of the hand HR in the virtual space also changes based on a result of the detection. According to the present embodiment, the item BM is disposed at a height of the raised hand HR. That is, the item BM is disposed at a location that the user cannot come into contact with in the normal operating state (in driving with both hands) as illustrated in FIG. 10A and can come into contact with in an abnormal operating state (in driving with one hand) as illustrated in FIG. 10B.

Figure 6B:
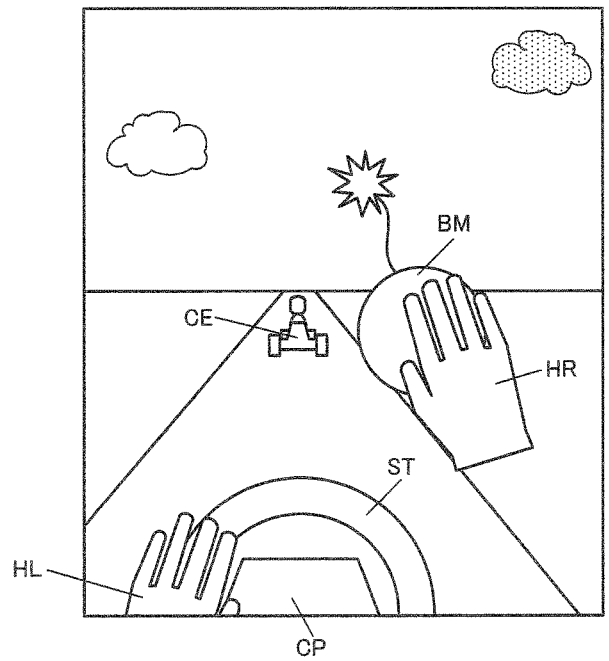

Then, the user US in the real space moves the hand to cause the hand HR of the user character in the virtual space to move and approach (come into contact with) the item MB, and succeed in acquiring the item BM as illustrated in FIG. 6B. That is, the item BM is acquired by the item acquisition motion made by the user US. At this time, the notification process is performed, for example, by an image, sound or vibration to notify of the acquisition of the item BM. Once the item BM is successfully acquired, the item BM of the bomb is put in the possessed state and moves integrally with the hand HR. For example, the item BM moves to follow the motion of the hand HR (a bone of the hand) of the user character. For example, the item BM is registered as a part object subordinate to the hand HR.

Figure 7A:
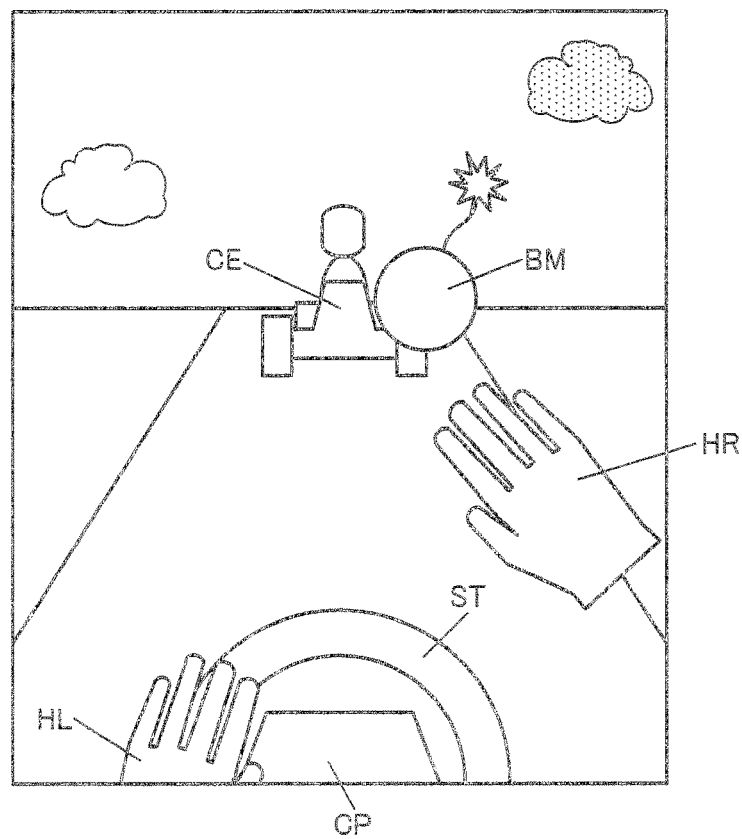
FIG. 7A and FIG. 7B are examples of game images generated according to the present embodiment.
Figure 11:
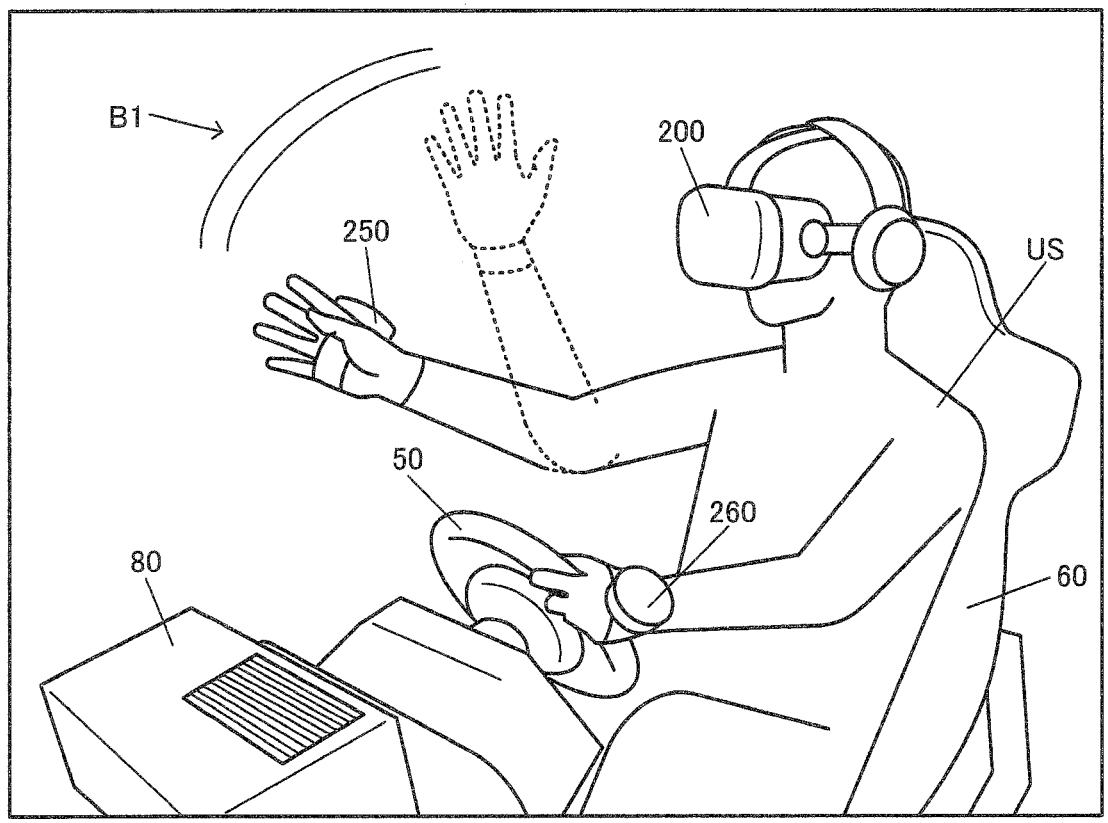
FIG. 11 is diagram illustrating motions of a user in gameplay.

The user US who has succeeded in acquiring the item BM of the bomb makes the item use motion as indicated by B1 in FIG. 11, for example. The user US makes a throwing motion of throwing the bomb with the hand swinging from a near side toward a far side as seen from the point of view of the user with a form of an overhand throw for example. Accordingly, as illustrated in FIG. 7A, a throwing motion that the hand HR of the user character throws the item BM of the bomb is also made in the virtual space. For example, the throwing motion of the item BM is made with the right hand HR while the left hand HL is holding the steering wheel ST. As a result, the item BM of the bomb is thrown and flies toward the opponent's car CE. That is, the item use process is executed.

Figure 7B:
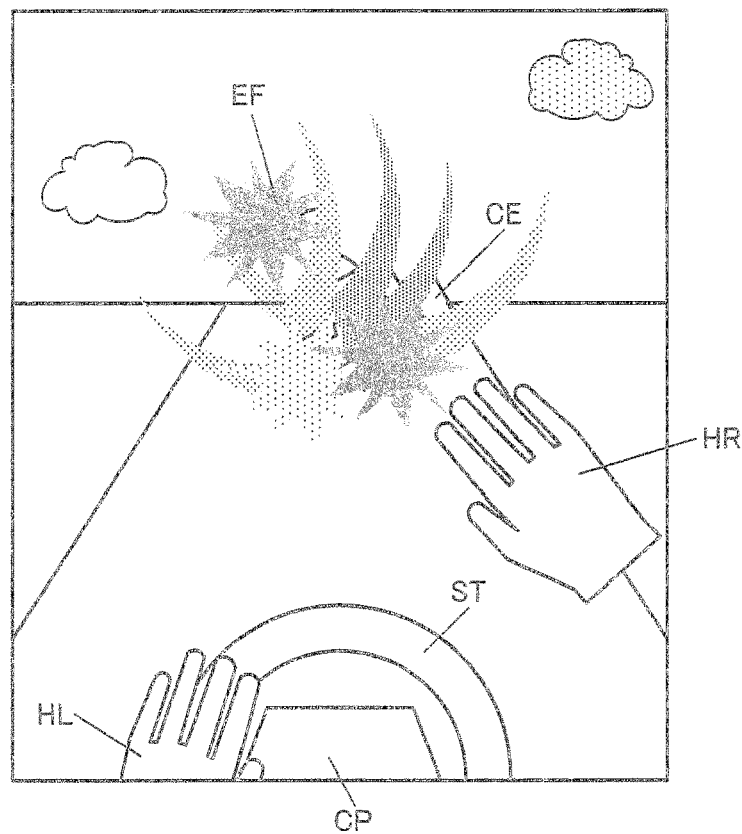

Then, as illustrated in FIG. 7B, the thrown item BM of the bomb hits the opponent's car CE, which causes an image of an effect EF such as an explosion to be displayed and gives damage to the opponent's car CE.

Figure 8A:
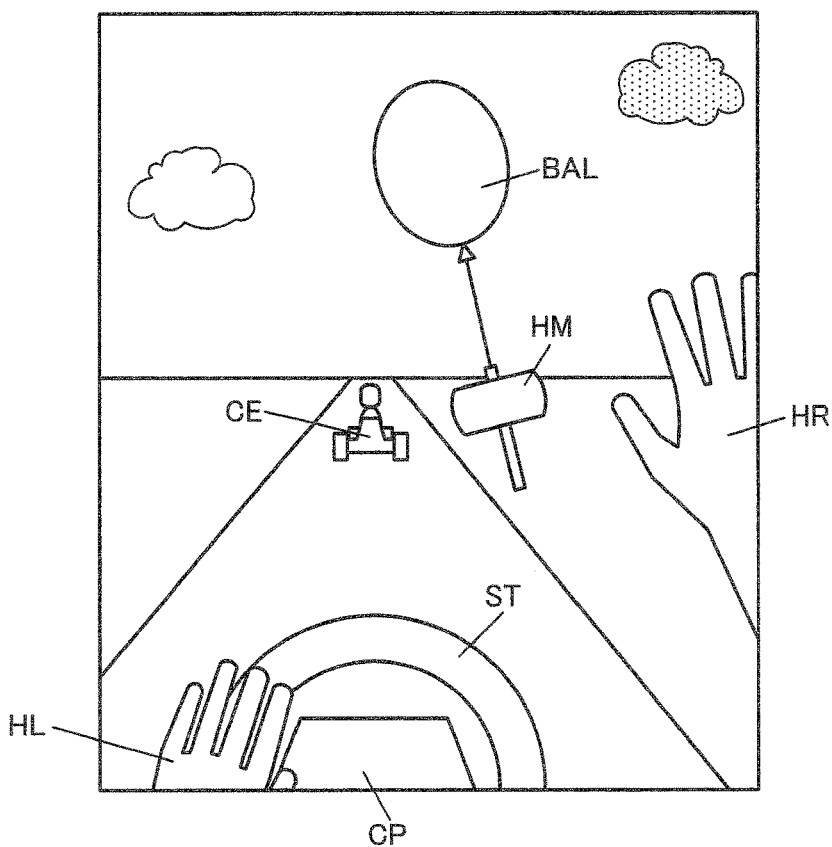
FIG. 8A and FIG. 8B are examples of game images generated according to the present embodiment.
Figure 8B:
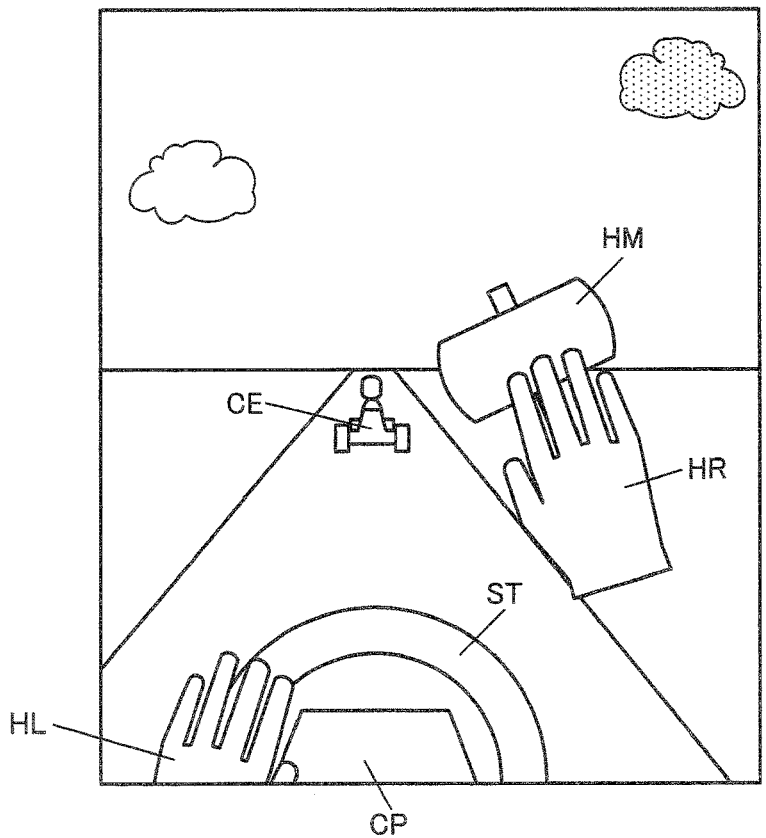

Alternatively, an item HM of a hammer attached to the balloon BAL appears in FIG. 8A. The item HM is successfully acquired by the hand HR due to the item acquisition motion by the user US, and is set in the possessed state as illustrated in FIG. 8B. That is, the item HM is made to move integrally with the hand HR as if the hammer were held with the hand.

Figure 9A:
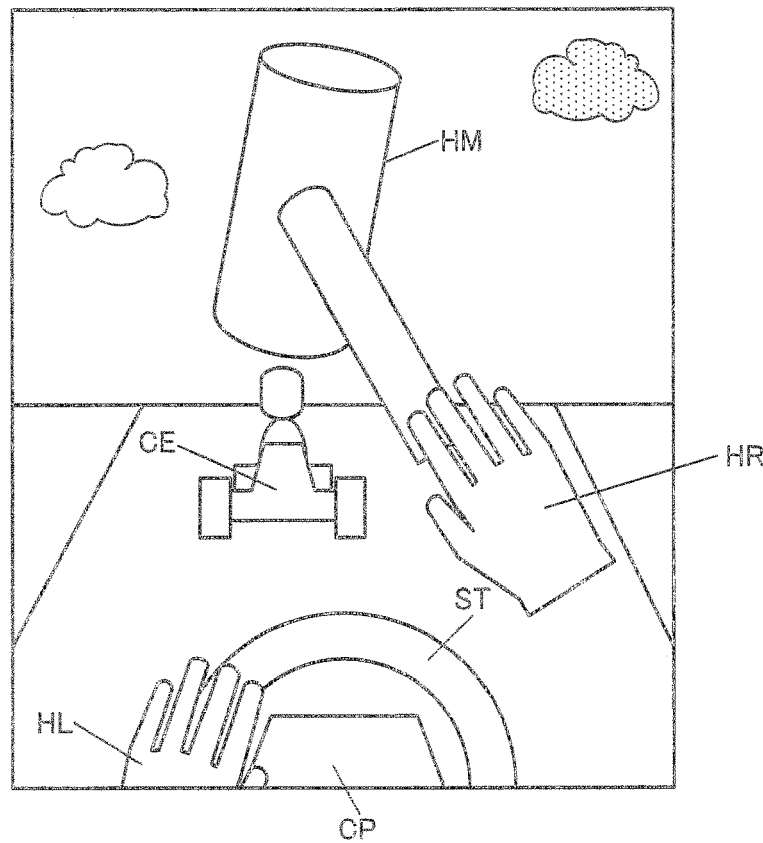
FIG. 9A and FIG. 9B are examples of game images generated according to the present embodiment.
Figure 9B:
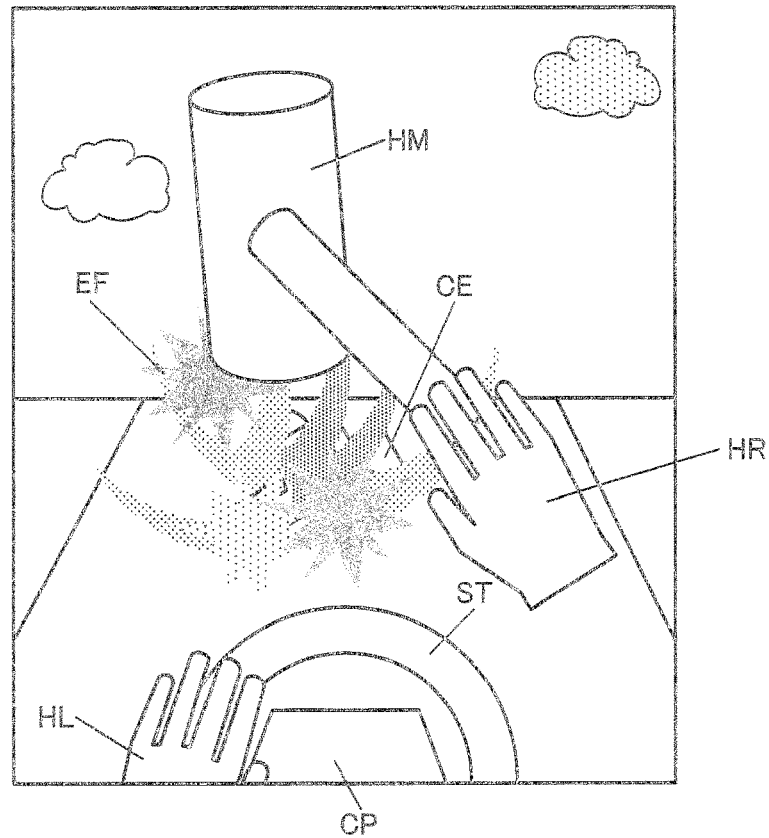
Figure 12A:
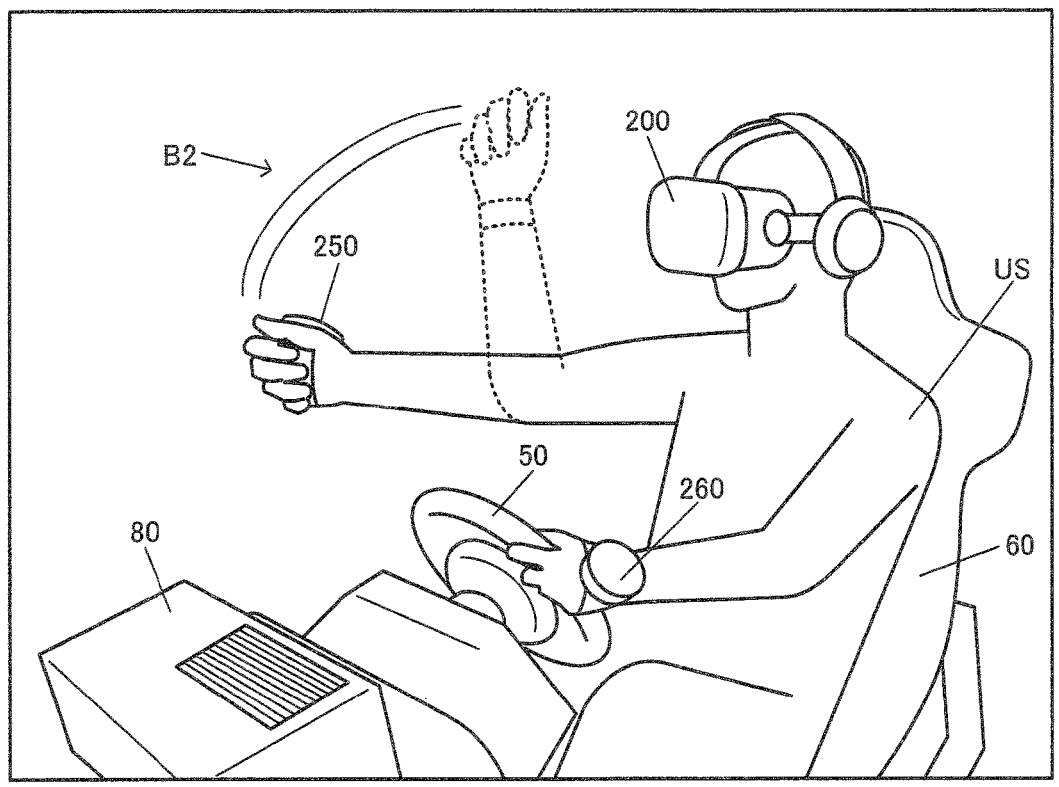
FIG. 12A and FIG. 12B are diagrams illustrating motions of a user in gameplay.

Then, as indicated by B2 in FIG. 12A, the user US makes a swinging motion of swinging the hand in a vertical direction as the item use motion. Accordingly, as illustrated in FIG. 9A, a swinging motion that the hand HR of the user character holding the item HM of the hammer swings in the vertical direction is also made in the virtual space. Then, as illustrated in FIG. 9B, the swung item HM of the hammer hits the opponent's car CE, which causes an image of an effect EF indicating a hit by the hammer to be displayed and gives damage to the opponent's car CE.

In the case of the hammer, when the user US swings the hand in the vertical direction as indicated by B2 in FIG. 12A, the motion (item use motion) of swinging the item HM of the hammer in the vertical direction is also made in the virtual space. Alternatively, when the user US swings the hand in an oblique direction as indicated by B3 in FIG. 12B, a motion of swinging the item HM of the hammer in the oblique direction is also made in the virtual space. That is, in whichever direction the user US makes the swinging motion, the motion of swinging the item HM is made in the corresponding direction.

On the other hand, in the case of the bomb, the throwing motion of throwing the item BM of the bomb is made only when the user swings the hand from the near side to the far side in the vertical direction in the form of the overhand throw as illustrated in FIG. 11 for example. For example, when the user swings the hand in a horizontal direction like a sidearm throw for example, the throwing motion of throwing the item BM of the bomb is not made. In addition, for example, the throwing motion of throwing the item BM of the bomb is made only when a speed of swinging the hand is equal to or higher than a given speed. According to the present embodiment, as described above, the item use process is executed in accordance with the motion direction of the item use motion, the intensity (speed) of the item use motion, the state (position, direction) of the hand HR (predetermined body part) of the user US during the item use motion, or the like. For example, whether to execute the item use process is determined or details (a level) of an execution process is set.

As described above, the method according to the present embodiment enables the user to feel the virtual reality as if he/she acquired a real bomb with his/her hand and threw it to the opponent's car, or held a real hammer with his/her hand and hit the opponent's car. For example, according to the present embodiment, since the motion of the hand of the user is detected by the tracking device, the motion of the hand of the user in the real space links with the motion of the hand of the user character in the virtual space. As a result, the method according to the present embodiment offers an advantage of significantly improving the virtual reality, compared with a method for performing a throwing operation of the bomb using an operation member such as a keyboard, mouse, or a game controller.

4.2 Acquisition and Use of Item

Next, a method according to the present embodiment is described in more detail. According to the present embodiment as described with reference to FIGS. 5A to 12B, the item can be acquired when the user, who has been in the normal operating state in the real space, takes one of his/her hands off the steering wheel 50 and makes the item acquisition motion for example. At this time, according to the present embodiment, the item area (item disposing location) is set to the location where the user character cannot come into contact with when the user is in the normal operating state.

Figure 13:
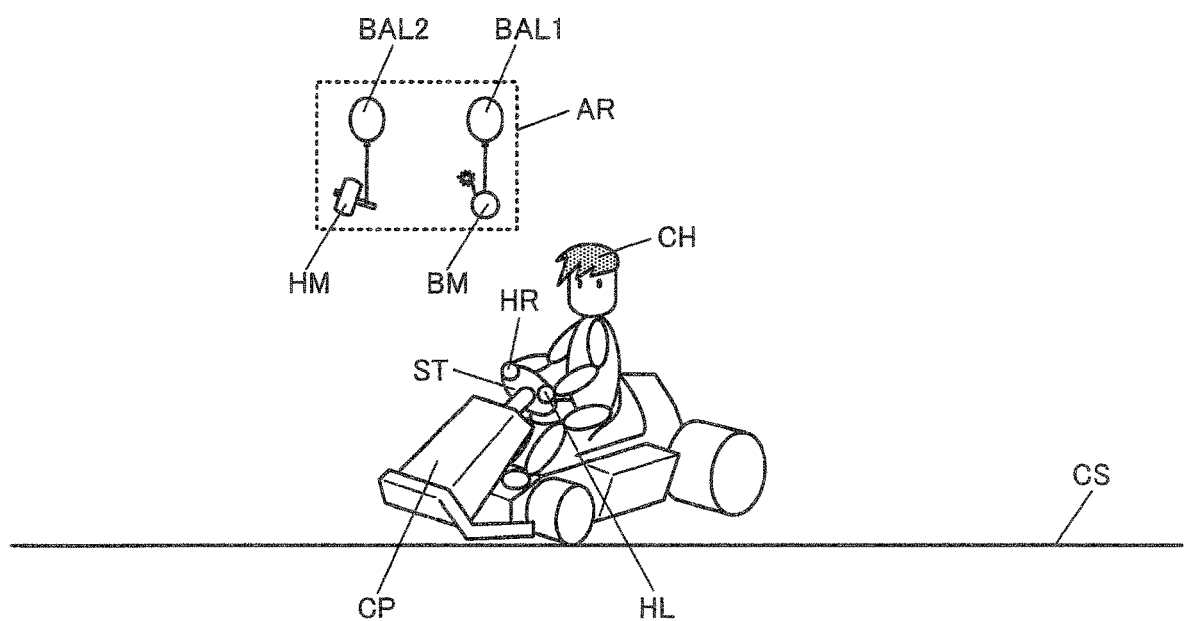
FIG. 13 is a diagram illustrating a setting of an item area.

For example, in FIG. 13, the user is in the normal operating state and a user character CH corresponding to the user is running on a course CS on the car CP. Since the user is in the normal operating state with both hands holding the steering wheel, the user character CH driving the car CP in the virtual space is also in the normal operating state with both hands holding the steering wheel ST. At this time, in FIG. 13, an item area AR where the items HM and BM are disposed is set to a location that the user character CH cannot come into contact with when the user is in the normal operating state. That is, since both hands HR and HL of the user character CH are holding the steering wheel ST, the user character CH cannot touch the items HM and BM in the item area AR unless the user in the real space raises one of his/her hands to cause the user character CH to raise one of its hands HR and HL. As a result, the user character CH cannot acquire the items HM and BM in the normal operating state with both hands holding the steering wheel ST, thereby preventing occurrence of an unnatural situation where the user character CH acquires the items HM and BM though the user does not intend to do so.

For example, if the items HM and BM were unintentionally acquired only by driving the car CP on the course CS, the user could not understand why he/she was able to acquire the items HM and BM, which deteriorates the virtual reality for the user. Thus, with the items HM and BM disposed to the location that is out of reach in the normal operating state, it is possible to prevent a situation where the user unintentionally acquires the items HM and BM and feels it unnatural. As a result, the virtual reality is improved. Note that the method for disposing the item area and the items is not limited to that illustrated in FIG. 13, and it is possible to employ a modification for disposing the item area and the items to a location that the user can come into contact with in the normal operating state, for example.

Then, according to the present embodiment, when it is determined that the user has made the item acquisition motion toward the direction of the item, the process of causing the user character to acquire the item is performed. Specifically, it is determined that the item acquisition motion has been made upon determination that the body part of the user character corresponding to the predetermined body part of the user has approached (has come into contact with) the item due to the motion of the predetermined body part made by the user.

For example, it is determined that the user has made the item acquisition motion toward the direction of the item when the user (US), who was in the normal operating state as illustrated in FIG. 10A, has taken one of his/her hands off the steering wheel 50 and has raised it upward. This determination process is performed based on the body part information (user information in a broad sense) such as the position or direction of the hand detected by the tracking device 250 or 260 worn on the hand of the user. Accordingly, when the user raises his/her hand, the user character in the virtual space also raises its hand HR upward as illustrated in FIG. 6A, whereby the acquisition of the item BM is enabled.

Figure 14A:
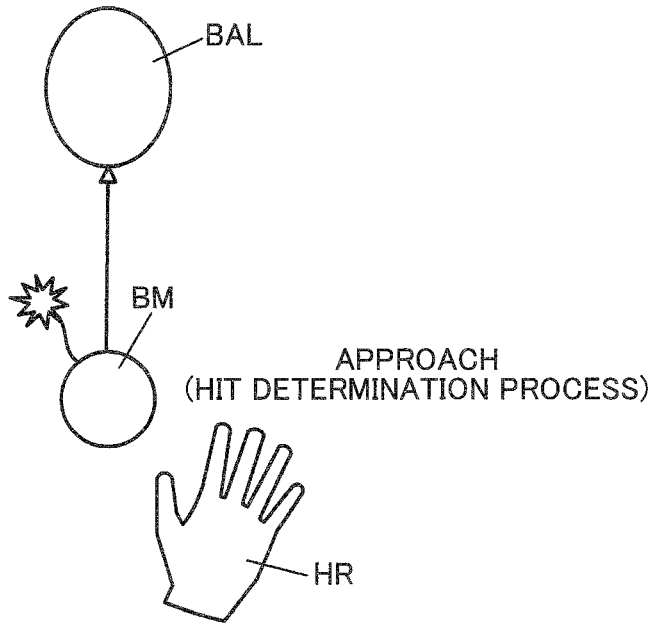
FIGS. 14A to 14D are diagrams illustrating acquisition, possession, and use of an item.
Figure 14B:
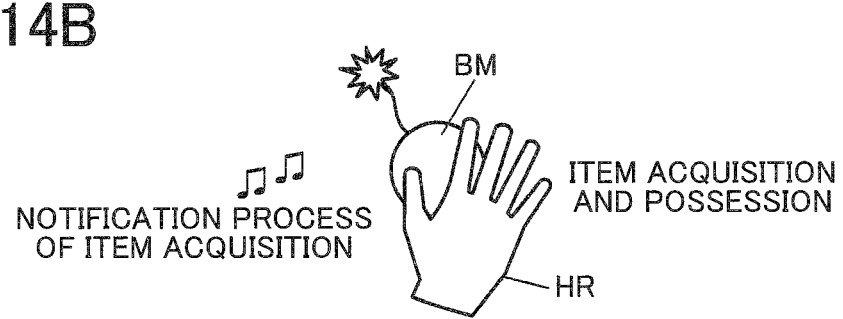

Then, when it is determined that the hand HR of the user character has approached the item BM as illustrated in FIG. 14A, it is determined that the item BM is acquired as illustrated in FIG. 14B. For example, it is determined that the item BM is acquired when a distance between the hand HR of the character and the item BM becomes equal to or shorter than a threshold value. More specifically, for example, it is determined that the item BM is acquired when the hit determination process, performed using a hit volume or the like set to the item BM and a hit volume or the like set to the hand HR, results in a hit determination. This hit determination process is performed based on the position information of the item BM in the virtual space and the body part information (position, direction) of the hand of the user detected by the tracking device 250 or 260.

Then, once the item BM is acquired as illustrated in FIG. 14B, the item BM is registered as a possessed item by the user character, and is put in the possessed state where the item BM is subordinate to the hand HR to be integrated with the hand HR. In addition, once the item BM is acquired, the notification process is performed to notify of the item acquisition by an image such as an effect, sound such a sound effect, or vibration. This notification process enables the user to recognize the item acquisition by sight, hearing, or touch.

Furthermore, according to the present embodiment, the item use process is executed when it is determined that the user has made the item use motion using the predetermined body part for example, with the item acquired and possessed by the user character. For example, it is considered that the item use process has been executed when it is determined that the user has made the predetermined motion with the item possessed based on the user information. The item use motion in this case is a motion of the predetermined body part such as the hand used to acquire the item. That is, when the item has been acquired with the hand serving as the predetermined body part, it is determined whether the item use motion such as throwing the item is made with that hand.

Figure 14C:
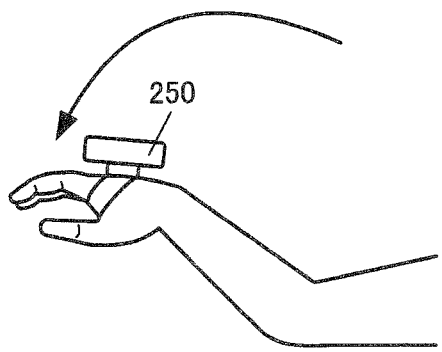
Figure 14D:
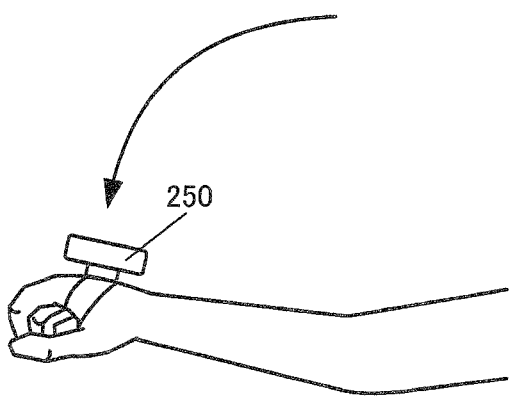

For example, it is determined that the item use motion of throwing the item is made in FIG. 14C and the item use motion of swinging the item is made in FIG. 14D. For example, in the case illustrated in FIGS. 6A to 7B, it is determined that the item use motion of throwing the item BM of the bomb has been made. Accordingly, the item use process is executed such that the item BM of the bomb flies toward the opponent's car CE, the effect EF of the explosion caused by the hit to the opponent's car CE is generated, the damage is given to the opponent's car CE, or the like. In the case illustrated in FIGS. 8A to 9B, it is determined that the item use motion of swinging the item HM of the hammer has been made. Accordingly, the item use process is executed such that the item HM of the hammer is swung with the opponent's car CE as a target, the effect EF of the explosion caused by the hit to the opponent's car CE is generated, the opponent's car CE rolls due to the impact of the hit of the hammer, or the like.

Figure 12B:
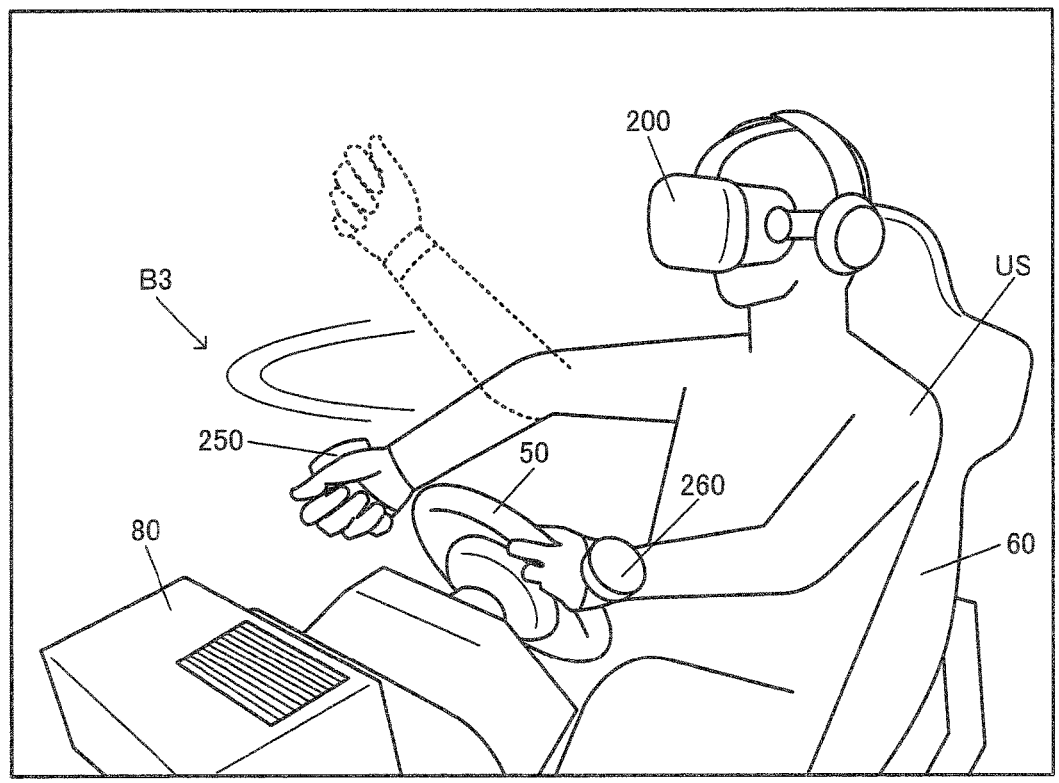

At this time, according to the present embodiment, the item use process is executed by determining whether to execute the item use process or setting the execution details of the item use process based on the motion direction of the item use motion, the intensity of the item use motion, the type of the item, the line-of-sight information of the user during the item use motion, or the state of the hand (predetermined body part) of the user making the item use motion. For example, in the case of the item BM of the bomb in FIGS. 6A to 7B, the item use process of throwing the item BM of the bomb is executed when the motion direction of the hand of the user is in a direction of the overhand throw as illustrated in FIG. 11, and a release speed in throwing that serves as the intensity of the item use motion is equal to or higher than a predetermined speed. On the other hand, in the case of the item HM of the hammer as illustrated in FIGS. 8A to 9B, the item HM of the hammer is swung in directions corresponding to the motion directions of the hand of the user as illustrated in FIG. 12 A and FIG. 12B. In this case, even if a swing speed serving as the intensity of the item use motion is low, the item HM of the hammer is swung at the corresponding slow speed. That is, the item use process is executed by determining whether to execute the item use process or setting the execution details of the item use process based on the type of the item (bomb, hammer). Alternatively, for example, in a case of an item of a type that flies in a curved manner, the item is moved in a curved orbit in the item use process. In addition, for example, in a case of an item of a type that causes the opponent's car to skid such as a banana, the item use process is performed to cause the opponent's car to skid when the item is thrown in front of the opponent's car.

In the case of the item BM of the bomb as illustrated in FIGS. 6A to 7B, the item use process is executed also by reflecting the line-of-sight information of the user in the item use motion of throwing the item BM. For example, when the user makes the throwing motion of the item while directing the line-of-sight upward, the item BM is thrown upward forming a shape of an arch. The line-of-sight information of the user in this case is acquired by the tracking process of the HMD 200. In the case of the item BM of the bomb as illustrated in FIGS. 6A to 7B, the state such as the position and/or direction of the hand in throwing is also determined. For example, it is determined that the item use motion of throwing the item has been made on condition that the user directs the palm of the hand to a front side as illustrated in FIG. 11, so that the item use process is executed. That is, the item use process is executed on condition that the palm of the hand is directed toward a direction of throwing. Executing the item use process in accordance with various conditions and information as described above enables implementation of the item use process closer to an event in the real world, thereby improving the virtual reality for the user.

According to the present embodiment, the body part information such as the position and/or direction of the body part (body part object, part object) of the user character corresponding to the predetermined body part of the user is detected by the tracking device 250 or 260, and the body part of the user character is displayed at a position in the virtual space corresponding to the detected position. Specifically, the body part information including at least one of the position information and direction information of the predetermined body part such as the hand is acquired as the user information, and the body part of the user character corresponding to the predetermined body part is arranged and set in the virtual space based on the acquired body part information. Then, the process of displaying the body part arranged and set in the virtual space is performed. For example, when the user turns the steering wheel 50 to the right or left in FIG. 10A, an image of the hands HR and HL (body parts in a broad sense) of the user character, corresponding to the hands of the user, turning the steering wheel ST to the right or left is displayed accordingly, as illustrated in FIG. 5A or FIG. 5B. When the user makes a throwing motion of throwing the bomb with one of his/her hands, images of the hand HR (pseudo hand) of the user character throwing the item BM of the bomb are displayed accordingly as illustrated in FIGS. 6B to 7A. When the user makes a swinging motion of swinging the hammer with one of his/her hands, images of the hand HR of the user character swinging the item BM of the hammer are displayed as illustrated in FIGS. 8B to 9A. As a result, the hand of the user and the hand of the user character in the virtual space move in linkage, thereby improving the virtual reality for the user.

Furthermore, according to the present embodiment, the item possessing state of the user character is canceled when a given condition is satisfied, with the item acquired and possessed by the user character. For example, when the user restores the normal operating state (basic posture state) after the item possessing state, the item possessing state is canceled. Alternatively, the item possessing state is canceled when a given time period has elapsed since the item possessing state started or a specific game situation (such as a collision, rolling, or a jump of the moving body) occurs.

For example, in FIG. 15A, the user is in the normal operating state at first where the user holds and operates the steering wheel with both hands, and makes a motion of acquiring and possessing the item by taking one of his/her hands off the steering wheel. Then, the user makes the item use motion in this possessing state.

On the other hand, in FIG. 15B, the user is in the normal operating state at first, acquires and possesses the item with one of his/her hands, and then restores the normal operating state. Accordingly, once the user restores the normal operating state, the item possessing state is canceled, so that the item is deleted or not displayed for example. As a result, the user is disabled to use the acquired and possessed item.

Consequently, the user is enabled to use the item only when the user in the normal operating state takes one of his/her hands off the steering wheel and possesses the item. Then, for example, when the user restores the normal operating state with both hands holding the steering wheel for focusing on driving, the item possessing state is automatically canceled, thereby improving convenience for the user. Alternatively, once a given time period (5 seconds to 10 seconds for example) has elapsed since the user character acquired and possessed the item, the item possessing state is canceled, and the item is deleted or not displayed. Alternatively, the item possessing state is also canceled in such a game situation that a car is put in a rolling state by an attack, a collision, a bump into a wall, or the like. Furthermore, for example, if the item hits the opponent's car when the opponent's car is jumping and the opponent's car is put into a rolling state or the like, a user of the opponent's car may have a 3D sickness. Therefore, the item possessing state is also canceled in such a game situation to disable the item use.

Note that the item whose possessed state is canceled may be temporarily made unusable and stocked. For example, the connection with the body part such as the hand of the user character is canceled, but the item is stocked to be used later. Then, when a use permission condition is satisfied, execution of the item use process of the stocked item may be enabled.

Furthermore, according to the present embodiment, the process of storing the user information on the user in the normal operating state in the storage section 170 is performed. For example, a process of storing the user information on the posture in the normal operating state is performed at the initial setting before a start of the game. For example, when the game is started, an operator or the like of a facility instructs the user to hold the steering wheel 50 with both hands as illustrated in FIG. 16A. Specifically, the operator instructs the user to hold the steering wheel such that a line from the right hand to the left hand passes through the center of the steering wheel 50. Then, the operator stores the body part information such as the positions and/or directions of the hands detected by the tracking devices 250 and 260 while the user is in the posture of the normal operating state in the storage section 170 (initial setting information storage section 174) as the initial setting information. The positions and/or directions of the hands are, for example, positions and/or directions in a coordinate space for detection by the base stations 280 and 284 in FIG. 2B.

As a result, it is possible to easily determine whether the user is in the normal operating state based on the stored body part information. Accordingly, it is possible to determine whether the user has taken his/her hand off the steering wheel 50 to get out of the normal operating state, or whether the user has restored the normal operating state in the cancel process of the item possessing state, by a simple process. In addition, for example, on condition that the user is determined to be in the normal operating state based on the stored body part information, it is possible to generate images of the user character moving its hands HR and HL holding the steering wheel ST in the virtual space, as illustrated in FIG. 5A and FIG. 5B, in linkage with the operation of the steering wheel 50 by the user in the real space.

Figure 16:
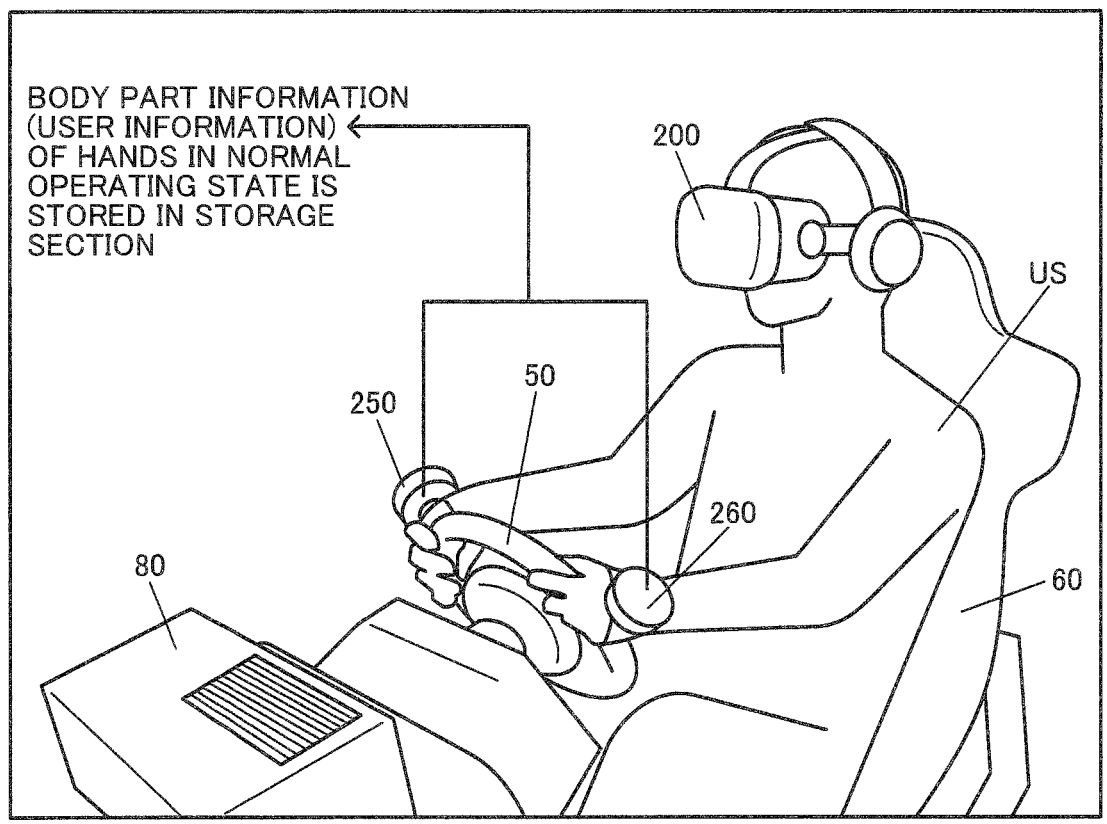
FIG. 16 is a diagram illustrating a method for storing body part information in a normal operating state.

For example, as for the movable chassis 30 in FIG. 4, the movable section 40 can be moved back and forth along the directions indicated by E1. As a result, the user can set the steering wheel 50 to his/her desirable position. Even in the case where an adjustment by the movable section 40 has been made as described, it is possible to appropriately detect the positions of the right and left hands of the user in the normal operating state and store them as the initial setting information, by detecting the positions of the hands or the like by the tracking devices 250 and 260, worn on the hands of the user as illustrated in FIG. 16, as the body part information. That is, there is no need to detect what adjustment has been made by the movable section 40 by another sensor for detecting an adjusted position.

Furthermore, according to the present embodiment, a determination process of item acquisition or the like is performed by detecting the body part information on the right and left hands of the user by the tracking devices 250 and 260. Therefore, it is advantageous that no consideration on circumstances such as a dominant arm of the user is necessary. For example, as for right-handed users, some may try to acquire the item with the right hand while holding the steering wheel 50 with the left hand during the item acquisition, and others may try to acquire the item with the left hand while holding the steering wheel 50 with the right hand. Thus, for example, a method in which the operator of the facility asks the dominant arm of the user before the start of the game does not enable appropriate determination on which hand the user uses for acquiring the item.

In this regard, as illustrated in FIG. 16, the item acquisition motion or the like of the user is determined using the tracking devices 250 and 260 worn on the right and left hands of the user. For example, as for the users trying to acquire the item with the right hand while holding the steering wheel 50 with the left hand, it is possible to determine that the item acquisition motion or the like has been made with the right hand by using the tracking device 250 worn on the right hand. On the other hand, as for the users trying to acquire the item with the left hand while holding the steering wheel 50 with the right hand, it is possible to determine that the item acquisition motion or the like has been made with the left hand by using the tracking device 260 worn on the left hand. Thus, the determination process can be appropriately performed without considering the circumstances such as the dominant arm of the user.

Furthermore, according to the present embodiment, as illustrated in FIGS. 10A to 12B, the user wears the HMD 200 to cover his/her field of view, and the game images as illustrated in FIGS. 5A to 9B are displayed as the display images for the HMD 200. Since the user wears the HMD 200 to cover his/her field of view, the user cannot see the tracking devices 250 and 260 because of the HMD 200 obstructing the view. Accordingly, it is advantageous that the user does not feel it unnatural if the tracking devices 250 and 260 are worn on the hands of the user, and can forget existence of the tracking devices 250 and 260 when the user immerses himself/herself in the game. In this sense, it is an effective method that the positions or the like of the hands are detected by the tracking devices 250 and 260 to perform the item acquisition process or the like in a system using the HMD 200.

Moreover, the user whose field of view is covered by the HMD 200 may hit his/her hand against the steering wheel 50 because the user cannot see the steering wheel 50 in the real space. In this regard, according to the present embodiment, as illustrated in FIG. 5A and FIG. 5B, the steering wheel ST in the virtual space corresponding to the steering wheel 50 in the real space, and the hands HR and HL of the user character corresponding to the hands of the user in the real space are displayed on the HMD 200. This display process is performed based on the body part information on the hands stored in the normal operating state as described with reference to FIG. 16. Accordingly, since the steering wheel 50 in the real space is positioned at a place corresponding to the steering wheel ST in the virtual space, it is possible to prevent a situation where the user playing the game while watching the display image on the HMD 200 hits his/her hand against the steering wheel 50.

Furthermore, according to the present embodiment, the process of moving the item in the moving direction of the moving body is performed during the item acquisition by the user character. For example, as illustrated in FIG. 6A, the user character is on the car CP (moving body) running on the course in the virtual space, and thus the hand HR of the user character moves at the same speed as that of the car CP. Accordingly, the relative speed of the item BM to the hand HR becomes high, which makes the acquisition of the item BM difficult.

Figure 17A:
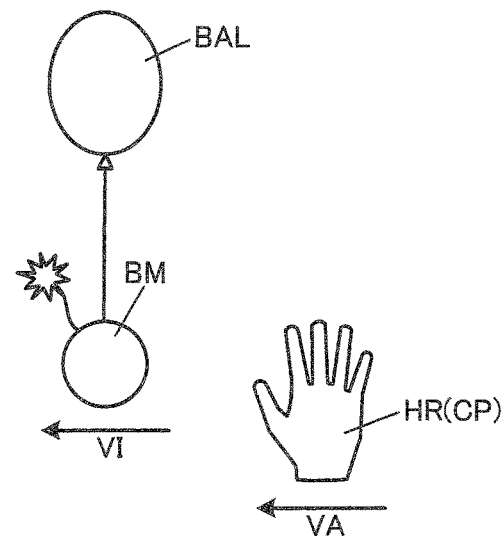
FIGS. 17A to 17C are diagrams illustrating a method for moving the item during the item acquisition.
Figure 17B:
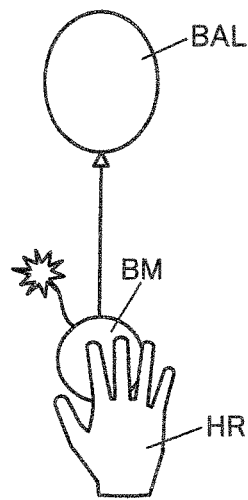

In this regard, according to the present embodiment, as illustrated in FIG. 17A, the process of moving the item BM in the moving direction of the car CP is performed during the acquisition of the item BM with the hand HR. For example, assuming that a moving speed of the car CP is VA, and the hand HR of the user character moves at the speed of VA, a movement process of moving the item BM at a speed achieving a relation of VI≤VA is performed. For example, when a distance between the hand HR and the item BM becomes equal to or shorter than a given distance, the movement process is started. As a result, the relative speed of the item BM to the hand HR can be reduced like handing over of a baton in a relay race, which enables the user to acquire the item BM easily, as illustrated in FIG. 17B. Consequently, it is possible to prevent a situation where the user can hardly acquire the item BM and thus cannot enjoy the game or immerse himself/herself in the game.

Various methods can be employed for a method for setting a speed VI in the movement process of moving the item BM in the speed VI during the item acquisition. For example, a difference between the speed VI and the speed VA may be set small for a beginner player to make the item acquisition easier, while the difference between the speed VI and the speed VA may be set large for a skilled player to make the item acquisition harder. For example, a handicap setting for gameplay is set by the speed VI. Alternatively, a special item or the like that can make the speed VI variable may be prepared. Alternatively, it is possible to employ a method in which the item BM is moved in an opposite direction to the moving direction of the hand HR during the item acquisition so as to make the item acquisition much harder.

Figure 17C:
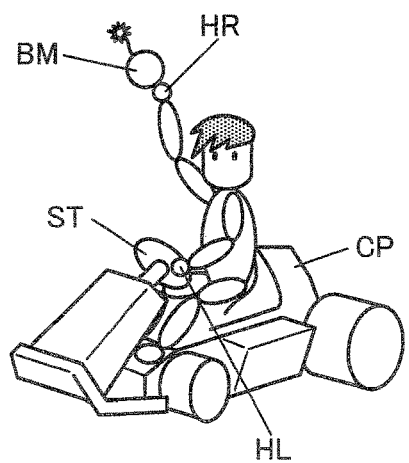

Furthermore, according to the present embodiment, the process of moving the item acquired and possessed by the user character to follow the movement of the moving body is performed. For example, in FIG. 17C, the item BM is acquired and possessed by the user character CH. In this case, the item BM moves together with the movement of the car CP ridden by the user character CH. For example, the item BM is connected to the hand HR of the user character CH to be integrated with the hand HR. For example, the position of the item BM is set to the position of the car CP in the local coordinate system. Accordingly, when the car CP moves on the course in the virtual space, the item BM also moves correspondingly to the movement of the car CP. Then, for example, it is possible to implement the item use process such as throwing the item BM of the bomb, as illustrated in FIG. 7A and FIG. 7B, using the hand HR of the user character CH used to acquire the item BM, as illustrated in FIG. 6B. Moreover, it is also possible to implement the item use process such as swinging the item BM of the hammer with the opponent's car CE as the target, as illustrated in FIG. 9A and FIG. 9B, using the hand HR of the user character CH used to acquire the item HM, as illustrated in FIG. 8B.

Furthermore, according to the present embodiment, the item area is set to the course on which the moving body moves. For example, the item area AR is set along the course CS on which the car CP as the moving body moves, as illustrated in FIG. 13 described above. As a result, it is possible to add an entertaining element of item acquisition, as well as entertaining elements of driving a car and competing with an opponent's car, to a game where the car is moved along a course such as a racing game. Consequently, interest to the game can be increased.

Furthermore, according to the present embodiment, the item disposing location may be set in accordance with the physical information of the user.

Figure 18A:
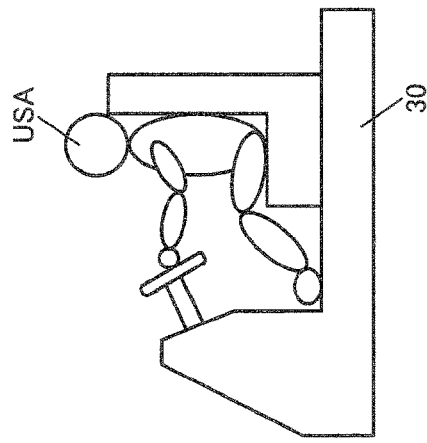
FIGS. 18A to 18D are diagrams illustrating a method for setting a location to dispose the item based on physical information.
Figure 18B:
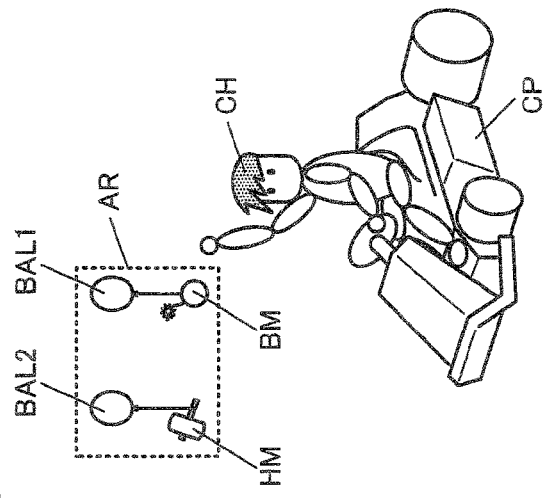

For example, as illustrated in FIG. 18A, an adult user USA is playing the game on the movable chassis 30 (game chassis) in the real space. In this case, as illustrated in FIG. 18B, the disposing locations of the items HM and BM (item area AR) are set to higher locations in the virtual space. As a result, the items HM and BM can be disposed to the locations corresponding to a raised hand of the taller adult user USA so as to enable the user USA to acquire the items HM and BM.

Figure 18C:
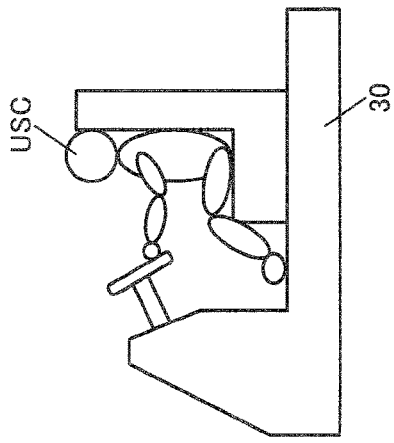
Figure 18D:
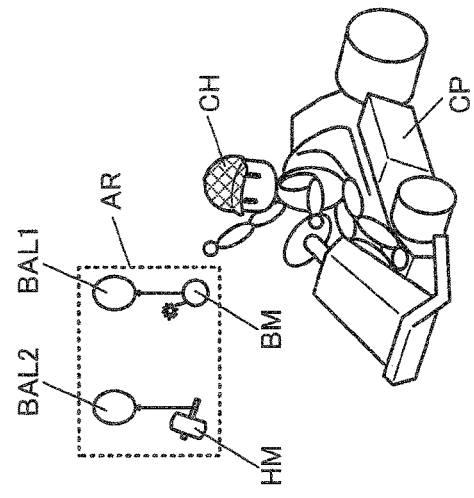

On the other hand, as illustrated in FIG. 18C, a child user USC is playing the game on the movable chassis 30 in the real space. In this case, as illustrated in FIG. 18D, the disposing locations of the items HM and BM (item area AR) are set to the locations lower than those in FIG. 18B in the virtual space. As a result, the items HM and BM can be disposed to the locations corresponding to a raised hand of the shorter child user USC so as to enable the user USC to appropriately acquire the items HM and BM. Consequently, with the items disposed in accordance with the physical information of the user such as the height or the physique, it is possible to dispose the items to the locations suitable to the height or the like of the user to enable the user to acquire the items.

The physical information of the user may be manually input in accordance with a statement from the user or the like before the start of the game, or a sensor or the like may automatically identify the physical information of the user such as the height or the physique.

4.3 Modifications

Next, a modification example of the present embodiment is described. With reference to FIGS. 4 to 18D, the example of application of the method according to the present embodiment to the game where the user character corresponding to the user is on the moving body such as the car is described, however, the present embodiment is not limited to this. For example, the method according to the present embodiment can be applied to a game that is played in a first-person point-of-view of a user character which is not on a moving body, such as an FPS and an RPG.

FIG. 4 is a diagram illustrating a field used in this kind of game. In this game, a field FL (play field, play area, play space) is prepared in a facility in the real world, and users US1 to US4 move in the field FL. The field FL is provided with a partition WL implemented by a wall or the like.

The users US1 to US4 wear HMD1 to HMD4 and carry gun-type controllers GN1 to GN4 (controllers in a broad sense). Each of the users US1 to US4 wears a tracking device SR1 to SR4 on his/her right hand, for example, and unillustrated tracking device on his/her left hand, as well. Using the tracking devices makes it possible to identify the positions, directions, or the like of the right and left hands of the users US1 to US4. The users US1 to US4 also have unillustrated processing apparatuses (backpack personal computers (PCs)) on their backs, for example. The users US1 to US4 work in a team (group in a broad sense) for a team battle game, for example. Images in the virtual space are displayed on the HMD1 to HMD4, so that the users US1 to US4 play a game such as a battle game while watching the images.

Figure 19:
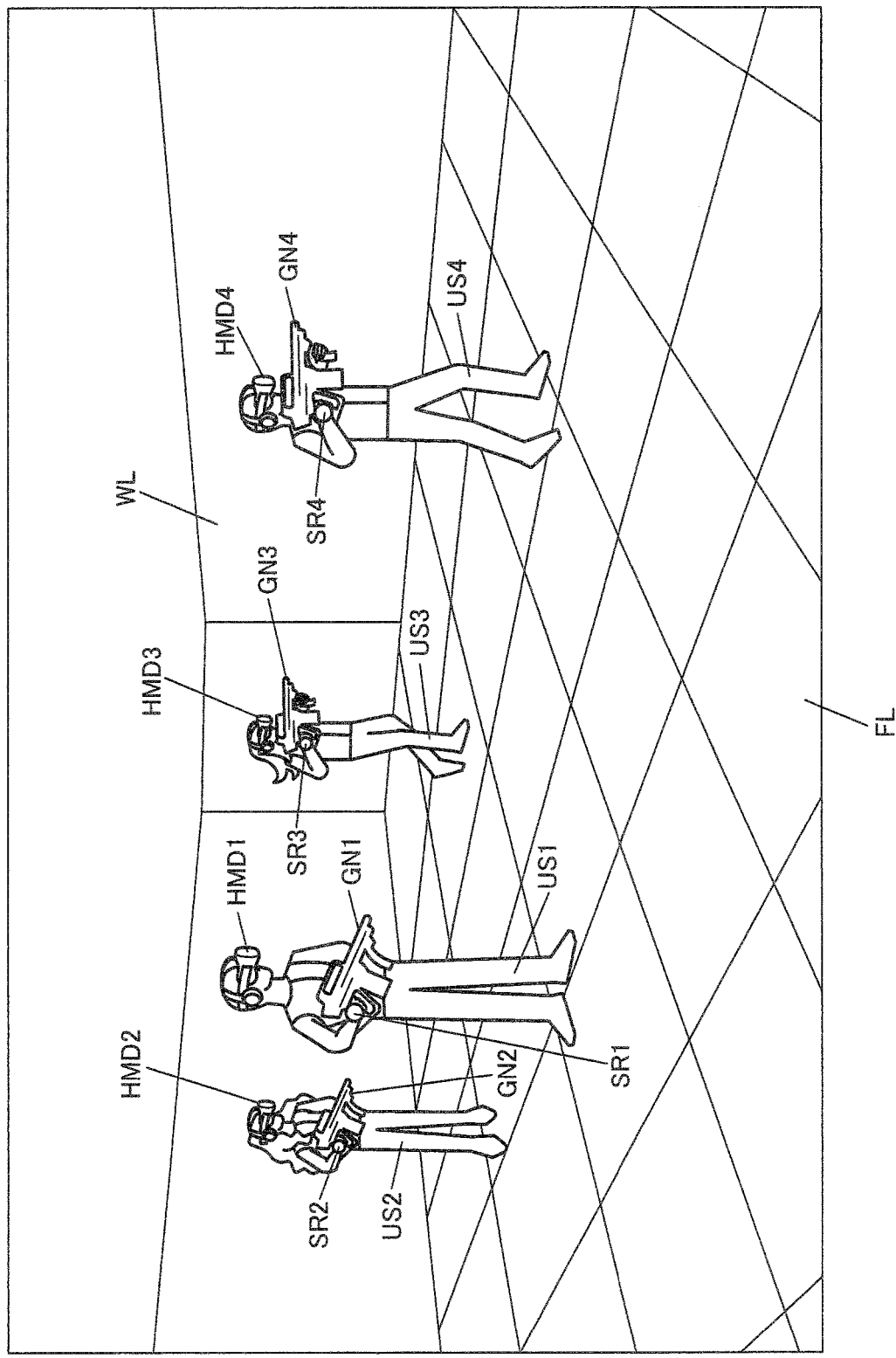
FIG. 19 is a diagram illustrating a field used in a simulation system according to a modification of the present embodiment.
Figure 20:
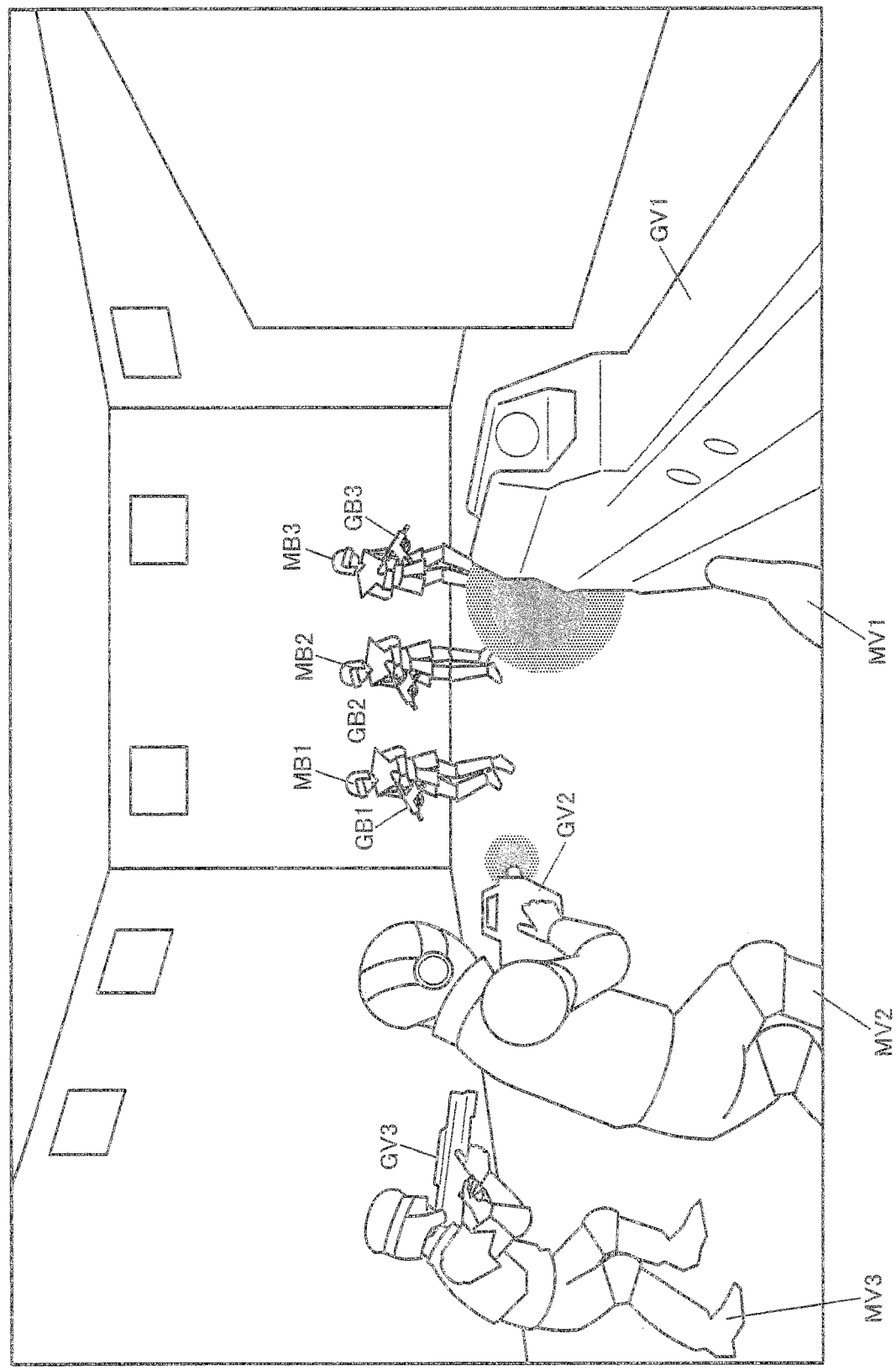
FIG. 20 is a diagram illustrating an example of a game image generated in the modification of the present embodiment.

FIG. 20 illustrates an example of a game image displayed on the HMD in this kind of game. For example, FIG. 20 illustrates an example of a game image displayed on the HMD1 of the user US1 illustrated in FIG. 19 in which a hand of a user character (user avatar) MV1 corresponding to the user US1 and a gun GV1 held by the hand are displayed. In addition, user characters MV2 and MV3 corresponding to the users US2 and US3 in the same team and user characters MB1, MB2, and MB3 corresponding to users in an enemy team are also displayed. The user characters MV1, MV2, and MV3 in the same team are attacking the enemy team by held guns GV1, GV2, and GV3, and the user characters MB1, MB2, and MB3 in the enemy team are attacking by held guns GB1, GB2, and GB3.

According to the present embodiment, in this kind of game, it is determined whether the item acquisition motion has been made by the user based on the user information (body part information) including at least one of the position information, direction information, and posture information of the user. When it is determined that the item acquisition motion has been made, the process of causing the user character to acquire the item is performed. Then, when it is determined that the user has made the item use motion, with the item acquired and possessed by the user character, based on the user information (body part information), the item use process is executed.

Figure 21A:
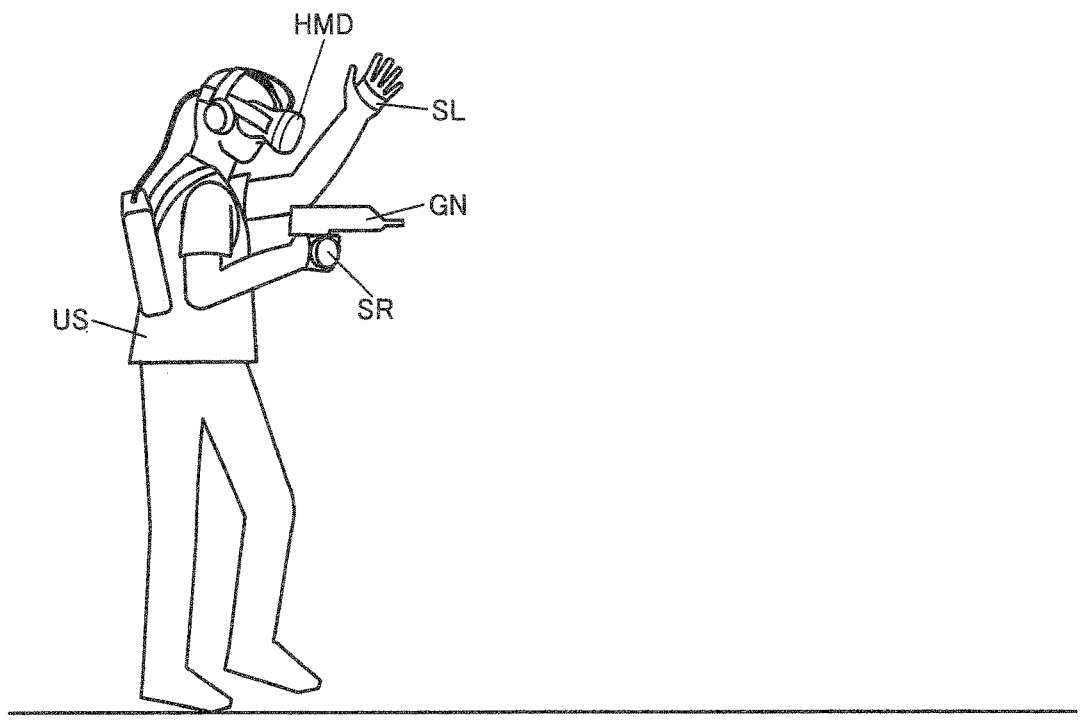
FIG. 21A and FIG. 21B are diagrams illustrating the acquisition and possession of the item according to the modification of the present embodiment.
Figure 21B:
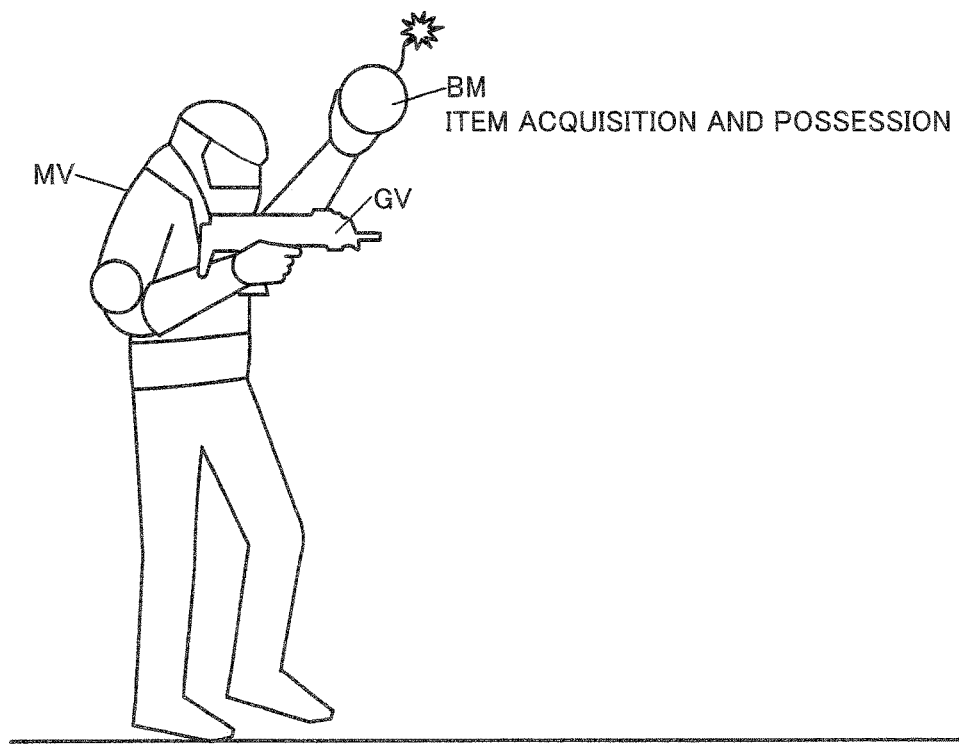

For example, as illustrated in FIG. 21A, a user US previously in a basic posture state makes an item acquisition motion of raising one of his/her hands to acquire an item. This item acquisition motion of the hand can be detected based on the body part information (user information) from the tracking device SL worn on the hand. Accordingly, due to the item acquisition motion of raising the hand of the user US, a user character MV serving as an avatar of the user US acquires the item BM of the bomb in the virtual space, as illustrated in FIG. 21B. As a result, the item BM is put in a possessed state by the user character MV.

Figure 22A:
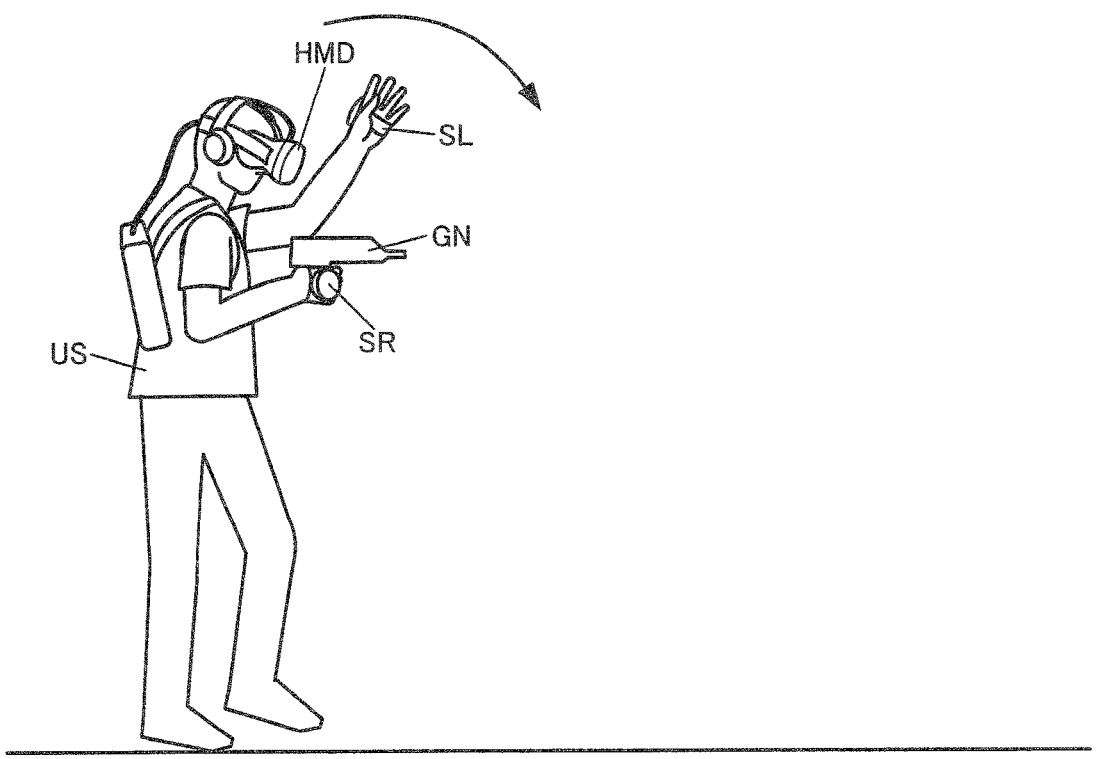
FIG. 22A and FIG. 22B are diagrams illustrating the use of the item according to the modification of the present embodiment.
Figure 22B:
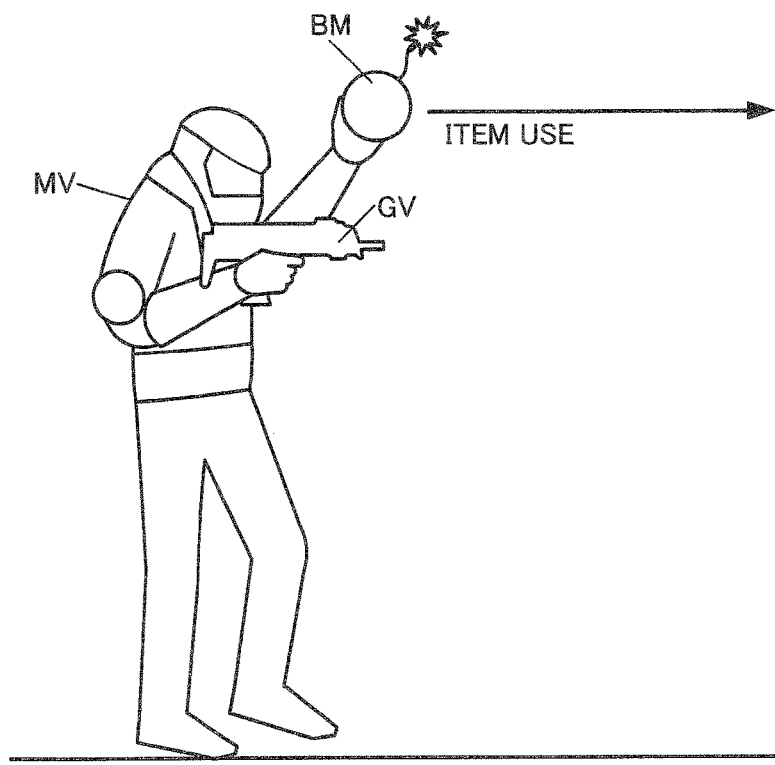

Then, the user US makes the item use motion with the item BM acquired and possessed by the user character MV, as illustrated in FIG. 22A. That is, the user US makes a throwing motion by swinging his/her hand forward from the near side. This item use motion can be detected based on the body part information (user information) from the tracking device SL worn on the hand. As a result, the user character MV in the virtual space throws the item BM held with his/her hand to execute the item use process. For example, when the item BM of the bomb hits an enemy, the item use process such as displaying the effect of the explosion of the bomb or giving damage on the enemy is executed.

As described with reference to FIGS. 21A to 22B, when the user moves one of his/her hands to make the item acquisition motion and uses the same one of his/her hands to make the item use motion, the item use process in which the user character MV acquires the item with corresponding one of its hands and throws the item to hit the enemy is executed. Then, detection of the item acquisition motion or the item use motion at this time is performed based on the body part information (user information) detected by the tracking device. Thus, it is possible to give the real virtual reality to the user as if the user was making a series of motions of acquiring and using the item such as the bomb in the real world. That is, it is possible to implement the virtual reality as if the user held the real bomb with his/her hand and threw it in the VR space expanding in the field of view of the user by wearing the HMD.

Furthermore, according to the present embodiment, it is determined whether the user, who was in the basic posture state, has made the item acquisition motion based on the user information. When it is determined that the user has made the item acquisition motion, the process of causing the user character to acquire the item is performed. Then, when it is determined that the user has restored the basic posture state after the user character acquired and possessed the item, the process of canceling the item possessing state of the user character is performed.

Figure 23A:
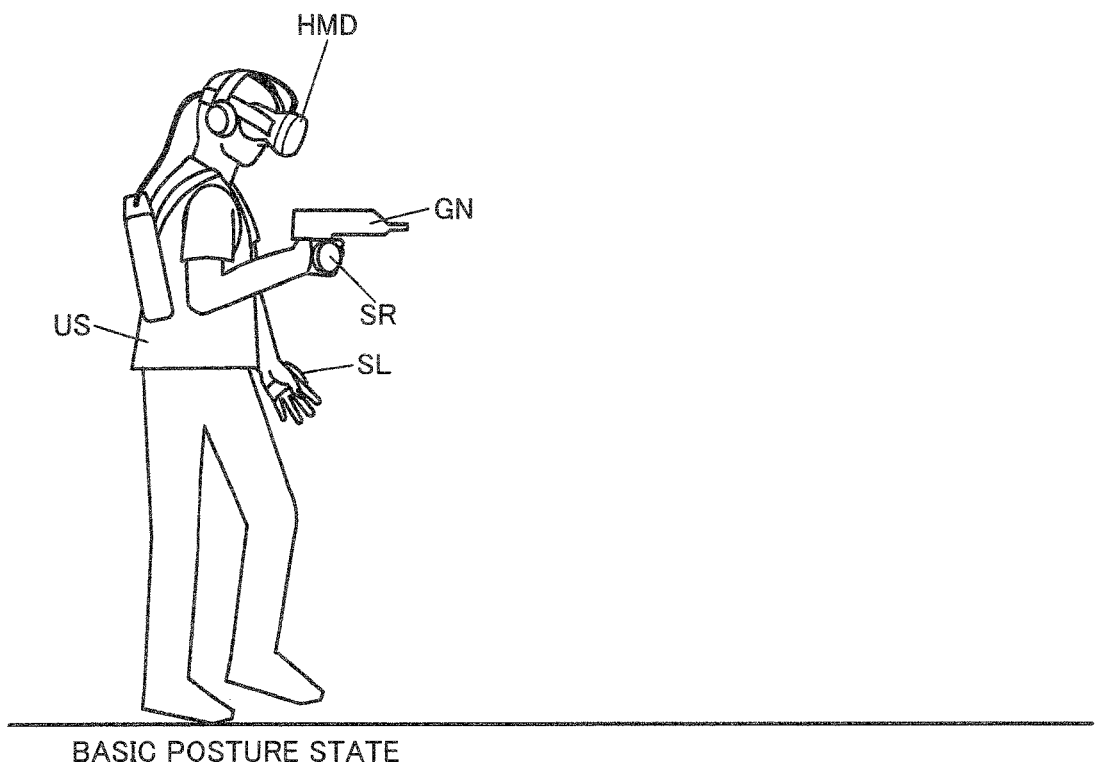
FIG. 23A and FIG. 23B are diagrams illustrating the acquisition, possession, and cancellation of the possession of the item according to the modification of the present embodiment.
Figure 23B:
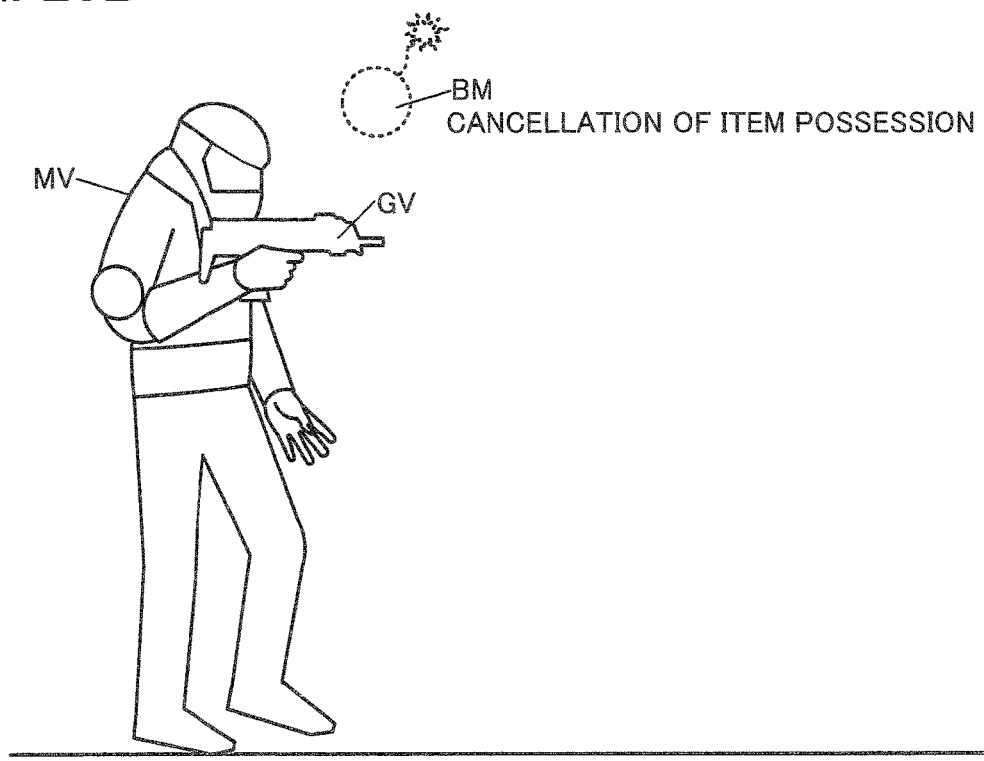

For example, according to the present embodiment, as illustrated in FIG. 21A and FIG. 21B, when it is determined that the user US has made the item acquisition motion, the process of causing the user character MV to acquire the item BM is performed. Then, assume that the user US has restored the basic posture state as illustrated in FIG. 23A after the user character MV acquired and possessed the item BM. That is, assume that the user has restored a normal basic posture state in which the user is not acquiring the item. The basic posture state (normal posture state) described here is a state in which the user holds a gun-type controller GN with one hand and places the other hand in front of the body without holding anything. When the user US restores the basic posture state as described above, the possessing state of the item BM of the user character MV is canceled in the virtual space, as illustrated in FIG. 23C. That is, the item BM is deleted and not displayed to disable the use of the item BM by the user character MV.

As a result, the user can use the item only when the user possesses the item through the item acquisition motion such as raising his/her hand from the basic posture state of the user. Then, for example, when the user has no intention to use the item and restores the basic posture state, the item possessing state is automatically canceled, thereby improving convenience for the user. Alternatively, the item possessing state may be canceled when a given time period has elapsed since the user acquired the item, or a specific game situation occurs. Moreover, the cancel process of the item possessing state may be a process of temporarily releasing the connection between the body part such as the hand of the user character and the item to keep the item in a stock place. Then, for example, the stocked item may be usable when a given use permission condition is satisfied by the user by raising his/her hand again within a limited time period, or the like.

4.4 Process Details

Next, a detailed example of a process according to the present embodiment is described with reference to flowcharts in FIG. 24 and FIG. 25.

Figure 24:
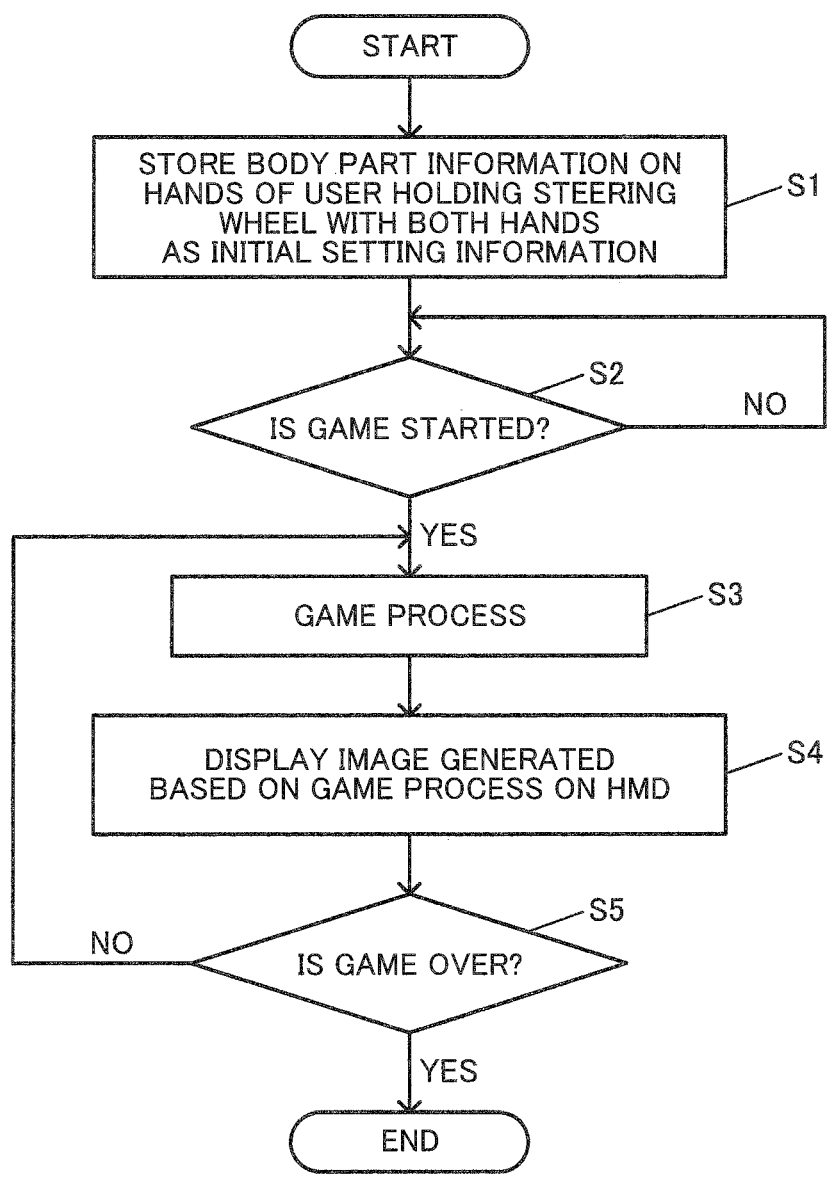
FIG. 24 is a flowchart illustrating a detailed process example according to the present embodiment.

FIG. 24 is a flowchart illustrating an outline of an overall process according to the present embodiment. First of all, the body part information on hands of the user holding the steering wheel with both hands is stored as the initial setting information (step S1). That is, as described with reference to FIG. 16, the process of storing the body part information on the hands in the normal operating state (basic posture state) in the storage section 170 is performed. Next, it is determined whether the game is started (step S2). When the game is started, the game process is executed based on the operation information or the tracking information. (step S3). Next, an image generated by the game process is displayed on the HMD (step S4). For example, the game images as illustrated in FIGS. 5A to 9B are generated and displayed on the HMD. Then, it is determined whether the game is over (step S5). When the game is over, the process is terminated.

Figure 25:
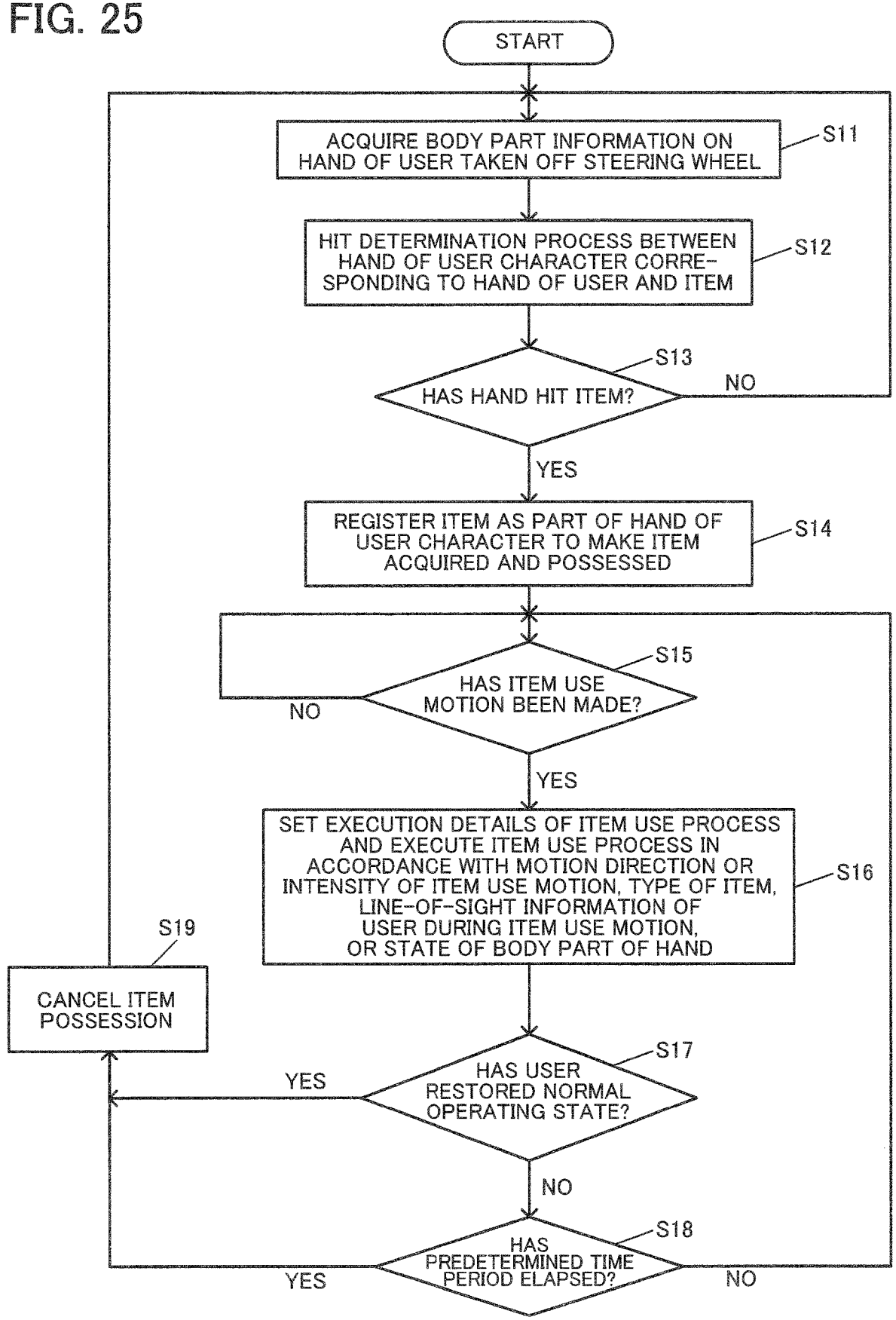
FIG. 25 is a flowchart illustrating a detailed process example according to the present embodiment.

FIG. 25 is a flowchart illustrating details of the item acquisition process and the item use process. First of all, the body part information on the hand of the user taken off the steering wheel is acquired (step S11). For example, as illustrated in FIG. 10B, the body part information on the hand is acquired by the tracking device 250 or 260 worn on the hand of the user. Next, the hit determination process between the hand of the user character corresponding to the hand of the user and the item is performed (step S12). That is, the hit determination process as described with reference to FIG. 14A is performed. Next, it is determined whether the hand has hit the item (step S13). When the hand has hit the item, the item is registered as part of the hand of the user character so as to be acquired and possessed by the user character (step S14). That is, the process of causing the item to be acquired and possessed is performed as illustrated in FIG. 14B. At this time, the notification process of the item acquisition is also performed.

Next, it is determined whether the item use motion has been made (step S15). For example, it is determined whether the use motions as illustrated in FIG. 14C and FIG. 14D have been made based on the body part information detected by the tracking device 250 or 260. Next, the execution details of the item use process are set and the item use process is executed in accordance with the motion direction or intensity of the item use motion, the type of the item, the line-of-sight information of the user during the item use motion, or the state of the body part of the hand (step S16). For example, the process includes moving the item, displaying the image of the effect caused by the hit of the item, giving damage to the opponent, or the like. Next, it is determined whether the user has restored the normal operating state (step S17), and when the user has restored the normal operating state, the possession of the item is canceled (step S19). In addition, it is determined whether the predetermined time period has elapsed (step S18), and when the predetermined time period has elapsed, the possession of the item is canceled (step S19).

As described above, in accordance with one of some embodiments, there is provided a simulation system comprising a processor including hardware, the processor being configured to perform: an information acquisition process of acquiring user information including at least one of position information, direction information, and posture information of a user; a virtual space setting process of setting a virtual space; a moving body process of moving a user character, corresponding to the user, in the virtual space; a game process that is a process for a game in the virtual space; and a display process of generating an image in the virtual space as a display image to be displayed for the user, in the game process, the processor may perform determining whether the user has made an item acquisition motion based on the user information, and upon determination that the user has made the item acquisition motion, a process of causing the user character to acquire an item.

In accordance with one of some embodiments, the user information including at least one of the position information, direction information, and posture information of the user is acquired. Then, in a game in which the user character corresponding to the user moves in the virtual space, it is determined whether the item acquisition motion has been made based on the acquired user information. When it is determined that the item acquisition motion has been made, a process of causing the user character to acquire the item is performed. As a result, in some embodiments, the simulation system that enables the item acquisition in a natural manner without deteriorating the sense of immersion in the game can be provided for the system that displays the image of the virtual space.

In accordance with one of some embodiments, there is provided the simulation system, wherein in the game process, the processor may perform determining whether the user, who was in a basic posture state, has made the item acquisition motion based on the user information, upon determination that the user has made the item acquisition motion, the process of causing the user character to acquire the item, and upon determination that the user has restored the basic posture state after the user character acquired and possessed the item, cancellation of an item possessing state of the user character.

As a result, in some embodiments, the user can cancel the possessing state of the acquired item by a simple motion of restoring the basic posture state after the acquisition and possession of the item.

In accordance with one of some embodiments, there is provided the simulation system, wherein the processor may perform: in the moving body process, a process of moving a moving body ridden by the user character in the virtual space; in the virtual space setting process, setting an item area to a location that the user character does not come into contact with when the user is in a normal operating state; and in the game process, determining whether the user has made the item acquisition motion toward a direction of the item in the item area based on the user information, and upon determination that the user has made the item acquisition motion, the process of causing the user character to acquire the item.

As a result, in some embodiments, the user character moves in the virtual space on the moving body, and the item area is set to the location that the user character cannot come into contact with when driving the moving body in the normal operating state. The user can acquire the item by making the item acquisition motion toward the direction of the item in this item area.

In accordance with one of some embodiments, there is provided the simulation system, wherein the processor may perform a process of storing the user information on the user in the normal operating state in a storage section.

As a result, in some embodiments, it is possible to execute various processes using the user information in the normal operating state by reading out the user information on the user in the normal operating state from the storage section.

In accordance with one of some embodiments, there is provided the simulation system, wherein in the virtual space setting process, the processor may perform setting the item area to a course on which the moving body moves.

As a result, in some embodiments, it is possible to implement a game including the moving body moving on the course, in which the item is disposed to the course to be acquirable.

In accordance with one of some embodiments, there is provided the simulation system, wherein in the game process, the processor may perform determining that the item acquisition motion has been made upon determination that the user has made a motion of moving a predetermined body part, and a body part of the user character corresponding to the predetermined body part has approached the item.

As a result, in some embodiments, the user can acquire the item by moving the predetermined body part to cause the corresponding body part of the user character to approach the item.

In accordance with one of some embodiments, there is provided the simulation system, wherein in the game process, the processor may perform executing an item use process upon determination that the user has made an item use motion using the predetermined body part, with the item acquired and possessed by the user character, based on the user information.

As a result, in some embodiments, the user can cause various processes using the item to be executed by making the item use motion with the predetermined body part while keeping the user character possessing the acquired item.

In accordance with one of some embodiments, there is provided the simulation system, wherein the processor may perform: in the information acquisition process, acquiring body part information including at least one of position information and direction information of the predetermined body part as the user information; in the virtual space setting process, setting an arrangement of the body part of the user character, corresponding to the predetermined body part, in the virtual space based on the body part information; and in the display process, a process of displaying the body part arranged and set in the virtual space.

As a result, in some embodiments, when the user moves the predetermined body part, the body part of the user character moves in linkage, and an image of the body part is displayed.

In accordance with one of some embodiments, there is provided the simulation system, wherein in the moving body process, the processor may perform a process of moving the item in a moving direction of a moving body during the item acquisition by the user character.

As a result, in some embodiments, it is possible to reduce a relative speed of the item with respect to the user character during the item acquisition, thereby preventing a situation where the item acquisition becomes harder.

In accordance with one of some embodiments, there is provided the simulation system, wherein in the moving body process, the processor may perform a process of moving the item acquired and possessed by the user character to follow a movement of a moving body.

As a result, in some embodiments, the item acquired and possessed can be moved to follow the movement of the moving body, and the user can perform various motions using the item.

In accordance with one of some embodiments, there is provided the simulation system wherein in the game process, the processor may perform executing an item use process upon determination that the user has made an item use motion, with the item acquired and possessed by the user character, based on the user information.

As a result, in some embodiments, it is possible to execute various processes using the item when the user makes the item use motion while keeping the user character possessing the acquired item.

In accordance with one of some embodiments, there is provided the simulation system, wherein in the game process, the processor may perform executing the item use process in accordance with at least one of a motion direction of the item use motion, intensity of the item use motion, a type of the item, line-of-sight information of the user during the item use motion, and a state of a predetermined body part of the user used to make the item use motion.

As a result, in some embodiments, the item use process can be executed by determining whether to execute the item use process or by setting execution details of the item use process in accordance with at least one of the motion direction and intensity of the item use motion, the type of the item, the line-of-sight information of the user, and the state of the predetermined body part of the user.

In accordance with one of some embodiments, there is provided the simulation system, wherein in the game process, the processor may perform canceling an item possessing state of the user character when a given condition is satisfied, with the item acquired and possessed by the user character.

As a result, in some embodiments, when the given condition is satisfied after the user has acquired and possessed the item, the item possessing state is canceled to disable use of the item or the like.

In accordance with one of some embodiments, there is provided the simulation system, wherein in the game process, the processor may perform a notification process of notifying of the item acquisition by an image, sound or vibration when the item is acquired.

As a result, in some embodiments, it is possible to make the user recognize the item acquisition by a sense of sight, hearing, or touch.

In accordance with one of some embodiments, there is provided the simulation system, wherein in the virtual space setting process, the processor may perform setting a disposing location of the item in accordance with physical information of the user.

As a result, in some embodiments, the item can be disposed to an appropriate location in accordance with the physical information of the user.

In accordance with one of some embodiments, there is provided the simulation system, wherein in the display process, the processor may perform generating, as the display image, a display image for a head mounted display worn by the user to cover a field of view of the user.

As a result, in some embodiments, it is possible to implement a game in which the item can be acquired while the moving body is moving in the VR space implemented by the head mounted display.

In accordance with one of some embodiments, there is provided an image processing method comprising: an information acquisition process of acquiring user information including at least one of position information, direction information, and posture information of a user; a virtual space setting process of performing a setting process of a virtual space; a moving body process of moving a user character, corresponding to the user, in the virtual space; a game process of performing a process for a game in the virtual space; and a display process of generating an image in the virtual space as a display image to be displayed for the user, in the game process, whether the user has made an item acquisition motion being determined based on the user information, and upon determination that the user has made the item acquisition motion, a process of causing the user character to acquire an item being performed.

Further, in accordance with one of some embodiments, there is provided a computer-readable information storage medium storing a program for causing a computer to perform the image processing method.

Although the present embodiment has been described in detail above, those skilled in the art will readily appreciate that many modifications are possible in the embodiment without materially departing from the novel teachings and advantages of the present disclosure. Accordingly, all such modifications are intended to be included within the scope of the present disclosure. For example, each of the terms (such as the hand, car, body part information, and normal operating state) that is at least once written together with a term of a wider sense or an alternative term (such as the predetermined body part, moving body, user information, and basic posture state) in the specification or the drawings can be replaced with the alternative term at any part of the specification or the drawings. The configuration of the simulation system, the configuration and construction of the movable chassis, the setting process of the virtual space, the process of disposing and setting the item area and items, the movement process of the moving body, the game process, the display process, the item acquisition process, the item use process, and the like are not limited to those described in the present embodiment, and methods, processes, and configurations equivalent to these are also included in the scope of the present disclosure. The present disclosure can be applied to various games. The present disclosure can be applied to various simulation systems such as an arcade game apparatus, a consumer game apparatus, a large attraction system where a large number of users play the game, and the like.

What is claimed is:

1. A simulation system comprising a processor including hardware, the processor being configured to perform:
   an information acquisition process of acquiring user information including at least one of position information, direction information, and posture information of a user;
   a virtual space setting process of setting a virtual space;
   a moving body process of moving a user character, corresponding to the user, in the virtual space;
   a game process that is a process for a game in the virtual space; and
   a display process of generating an image in the virtual space as a display image to be displayed for the user,
   in the game process,
   the processor performs
   determining whether the user has made an item acquisition motion based on the user information, and upon determination that the user has made the item acquisition motion, a process of causing the user character to acquire an item,
   wherein
   the processor performs:
   in the moving body process,
      a process of moving a moving body ridden by the user character in the virtual space;
   in the virtual space setting process,
      setting an item area to a location that the user character does not come into contact with when the user is in a normal operating state; and
   in the game process, determining whether the user has made the item acquisition motion toward a direction of the item in the item area based on the user information, and upon determination that the user has made the item acquisition motion, the process of causing the user character to acquire the item.

2. The simulation system as defined in claim 1, wherein in the game process,
the processor performs
determining whether the user, who was in a basic posture state, has made the item acquisition motion based on the user information, upon determination that the user has made the item acquisition motion, the process of causing the user character to acquire the item, and upon determination that the user has restored the basic posture state after the user character acquired and possessed the item, cancellation of an item possessing state of the user character.

3. The simulation system as defined in claim 1, wherein in the game process,
the processor performs
a process of storing the user information on the user in the normal operating state in a storage section.

4. The simulation system as defined in claim 1, wherein in the virtual space setting process,
the processor performs
setting the item area to a course on which the moving body moves.

5. The simulation system as defined in claim 1, wherein in the game process,
the processor performs
determining that the item acquisition motion has been made upon determination that the user has made a motion of moving a predetermined body part, and a body part of the user character corresponding to the predetermined body part has approached the item.

6. The simulation system as defined in claim 5, wherein in the game process,
the processor performs
executing an item use process upon determination that the user has made an item use motion using the predetermined body part, with the item acquired and possessed by the user character, based on the user information.

7. The simulation system as defined in claim 5, wherein the processor performs:
in the information acquisition process,
acquiring body part information including at least one of position information and direction information of the predetermined body part as the user information;
in the virtual space setting process,
setting an arrangement of the body part of the user character, corresponding to the predetermined body part, in the virtual space based on the body part information; and
in the display process,
a process of displaying the body part arranged and set in the virtual space.

8. The simulation system as defined in claim 1, wherein in the moving body process,
the processor performs
a process of moving the item in a moving direction of a moving body during the item acquisition by the user character.

9. The simulation system as defined in claim 1, wherein in the moving body process,
the processor performs a process of moving the item acquired and possessed by the user character to follow a movement of a moving body.

10. The simulation system as defined in claim 1, wherein in the game process,
the processor performs
executing an item use process upon determination that the user has made an item use motion, with the item acquired and possessed by the user character, based on the user information.

11. The simulation system as defined in claim 10, wherein in the game process,
the processor performs
executing the item use process in accordance with at least one of a motion direction of the item use motion, intensity of the item use motion, a type of the item, line-of-sight information of the user during the item use motion, and a state of a predetermined body part of the user used to make the item use motion.

12. The simulation system as defined in claim 1, wherein in the game process,
the processor performs
canceling an item possessing state of the user character when a given condition is satisfied, with the item acquired and possessed by the user character.

13. The simulation system as defined in claim 1, wherein in the game process,
the processor performs
a notification process of notifying of the item acquisition by an image, sound or vibration when the item is acquired.

14. The simulation system as defined in claim 1, wherein in the virtual space setting process,
the processor performs
setting a disposing location of the item in accordance with physical information of the user.

15. The simulation system as defined in claim 1, wherein in the display process,
the processor performs
generating, as the display image, a display image for a head mounted display worn by the user to cover a field of view of the user.

16. An image processing method comprising:
an information acquisition process of acquiring user information including at least one of position information, direction information, and posture information of a user;
a virtual space setting process of performing a setting process of a virtual space;
a moving body process of moving a user character, corresponding to the user, in the virtual space;
a game process of performing a process for a game in the virtual space; and
a display process of generating an image in the virtual space as a display image to be displayed for the user,
in the game process,
whether the user has made an item acquisition motion being determined based on the user information, and upon determination that the user has made the item acquisition motion, a process of causing the user character to acquire an item being performed,
further comprising
performing, in the moving body process,
a process of moving a moving body ridden by the user character in the virtual space;
in the virtual space setting process, setting an item area to a location that the user character does not come into contact with when the user is in a normal operating state; and in the game process, determining whether the user has made the item acquisition motion toward a direction of the item in the item area based on the user information, and upon determination that the user has made the item acquisition motion, the process of causing the user character to acquire the item.

17. A computer-readable information storage medium storing a program for causing a computer to perform the image processing method as defined in claim 16.

18. The image processing method as defined in claim 16, further comprising determining whether the user, who was in a basic posture state, has made the item acquisition motion based on the user information, upon determination that the user has made the item acquisition motion, the process of causing the user character to acquire the item, and upon determination that the user has restored the basic posture state after the user character acquired and possessed the item, cancellation of an item possessing state of the user character.

19. The image processing method as defined in claim 16, further comprising in the game process, performing a process of storing the user information on the user in the normal operating state in a storage section.

20. The image processing method as defined in claim 16, further comprising in the virtual space setting process, setting the item area to a course on which the moving body moves.

* * * * *